United States Patent
Yuki

(10) Patent No.: US 9,064,235 B2
(45) Date of Patent: Jun. 23, 2015

(54) CONTENT SHARING SYSTEM AND METHOD, CONTENT RELAYING APPARATUS AND METHOD, AND CONTENT PROVIDING APPARATUS AND METHOD

(75) Inventor: Yasuhiro Yuki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 324 days.

(21) Appl. No.: 13/574,059

(22) PCT Filed: Nov. 24, 2011

(86) PCT No.: PCT/JP2011/006532
§ 371 (c)(1),
(2), (4) Date: Jul. 19, 2012

(87) PCT Pub. No.: WO2012/070241
PCT Pub. Date: May 31, 2012

(65) Prior Publication Data
US 2012/0290635 A1    Nov. 15, 2012

(30) Foreign Application Priority Data
Nov. 25, 2010    (JP) ................................. 2010-262996

(51) Int. Cl.
*G06F 15/16* (2006.01)
*G06Q 10/10* (2012.01)
(Continued)

(52) U.S. Cl.
CPC ............. *G06Q 10/10* (2013.01); *H04L 63/10* (2013.01); *H04L 12/588* (2013.01); *H04L 67/104* (2013.01); *G06Q 50/01* (2013.01)

(58) Field of Classification Search
CPC ...... G06Q 50/01; H04L 67/104; H04L 63/10; H04L 12/588; H04L 51/32
USPC .......................................................... 709/217
See application file for complete search history.

(56) References Cited

U.S. PATENT DOCUMENTS 8,365,299 B2    1/2013    Sakai et al.
8,706,853 B2 *  4/2014    Kamiwada et al. ........... 709/223
(Continued)

FOREIGN PATENT DOCUMENTS

CN    101843041 A    9/2010
JP    2005-218113    8/2005
(Continued)

OTHER PUBLICATIONS

International Search Report issued Jan. 24, 2012 in corresponding International Application No. PCT/JP2011/006532.
(Continued)

*Primary Examiner* — Jeong S Park
(74) *Attorney, Agent, or Firm* — Wenderoth, Lind & Ponack, L.L.P.

(57) ABSTRACT

In a content sharing system, a content relaying apparatus includes: a social information managing unit configured to obtain a familiarity degree indicating familiarity between a user of a content providing apparatus and a user of a content obtaining apparatus with reference to social information including the familiarity degree between the users when a first data obtainment request for obtainment of content data is received from the content obtaining apparatus; and a provision and relay determining unit configured to transmit, to the content obtaining apparatus, connection information for enabling the content obtaining apparatus to establish network connection with the content providing apparatus when the obtained familiarity degree is larger than or equal to a threshold value.

12 Claims, 26 Drawing Sheets

(51) Int. Cl.
*H04L 12/58* (2006.01)
*H04L 29/06* (2006.01)
*H04L 29/08* (2006.01)
*G06Q 50/00* (2012.01)

(56) References Cited

U.S. PATENT DOCUMENTS

| | | |
|---|---|---|
| 8,752,195 B2 | 6/2014 | Sakai et al. |
| 2002/0136467 A1* | 9/2002 | Kinoshita ............... 382/298 |
| 2005/0170819 A1 | 8/2005 | Barclay et al. |
| 2006/0069616 A1* | 3/2006 | Bau ......................... 705/14 |
| 2007/0288993 A1 | 12/2007 | Sakai et al. |
| 2009/0019149 A1* | 1/2009 | Cohen et al. ............ 709/224 |
| 2009/0133071 A1 | 5/2009 | Sakai et al. |
| 2009/0157829 A1* | 6/2009 | Choi et al. .............. 709/206 |
| 2009/0216859 A1* | 8/2009 | Dolling .................... 709/218 |
| 2009/0276459 A1* | 11/2009 | Trout et al. ............. 707/104.1 |
| 2010/0023594 A1* | 1/2010 | Kamiwada et al. ..... 709/207 |
| 2010/0318613 A1* | 12/2010 | Souza et al. ............ 709/206 |
| 2011/0010384 A1 | 1/2011 | Luo et al. |
| 2012/0084655 A1* | 4/2012 | Gallagher et al. ...... 715/725 |
| 2013/0111603 A1 | 5/2013 | Sakai et al. |

FOREIGN PATENT DOCUMENTS

| | | |
|---|---|---|
| JP | 2006-24060 | 1/2006 |
| JP | 2006-39918 | 2/2006 |
| JP | 2006-332990 | 12/2006 |
| JP | 2007-166116 | 6/2007 |
| JP | 2008-210255 | 9/2008 |
| JP | 2008-287407 | 11/2008 |
| JP | 2009-110484 | 5/2009 |
| JP | 2009-141952 | 6/2009 |
| WO | 2009/023982 A1 | 2/2009 |

OTHER PUBLICATIONS

Chinese Office Action issued Feb. 10, 2015, in corresponding Chinese Application No. 201180006948.2 (with English translation of Search Report).

* cited by examiner

| ID | Data name | Extension | Type | Apparatus ID | Image capturing date and time | Total time |
|---|---|---|---|---|---|---|
| 1 | C-1 | mp4 | Movie | DSC-X | 2002/10/1 09:15 | 34:05 |
| 2 | C-2 | mp4 | Movie | DSC-X | 2002/10/1 10:03 | 5:45 |
| 3 | C-3 | mp4 | Movie | DSC-X | 2002/10/1 10:05 | 14:55 |
| 4 | C-4 | mp4 | Movie | DSC-X | 2002/10/1 12:32 | 10:03 |
| 5 | C-5 | mp4 | Movie | DSC-X | 2002/10/1 12:33 | 4:13 |
| 6 | C-6 | mp4 | Movie | DSC-X | 2002/10/1 13:07 | 6:54 |
| 7 | C-7 | mp4 | Movie | DSC-X | 2002/10/1 14:44 | 33:22 |
| 8 | C-8 | mp4 | Movie | DSC-X | 2002/10/1 19:10 | 45:21 |
| 9 | C-9 | mp4 | Movie | DSC-X | 2002/10/2 09:50 | 25:32 |
| 10 | C-10 | mp4 | Movie | DSC-X | 2002/10/2 11:22 | 51:02 |
| ... | ... | ... | ... | ... | ... | ... |

FIG. 6A

| ID | User name | Address | Owned apparatus ID | Owned apparatus name | Apparatus-unique connection information |
|----|-----------|---------|--------------------|-----------------------|-----------------------------------------|
| 0 | Mike | mike@xxx.com | DSC-X | Mike-A | 133.124.123.1 : 8080 |
| 1 | Alice | alice@aaa.com | DSC-Z | Alice-B | 132.167.132.2 : 80/pub |
| 2 | Julia | julia@jjj.com | TV-J | Julia-C | 143.111.12.3 : 8081 |
| 3 | Tom | tom@ttt.com | DSC-T | Tom-D | 134.132.13.4 : 8080 |
| 4 | Paul | paul@ppp.com | CM-P | Paul-E | 133.144.12.5 : 80/contents |
| 5 | James | james@yyy.com | DSC-Y | James-F | 143.127.8.6 80/www |
| 6 | Dan | dan@ddd.com | CM-D | Dan-G | 133.182.24.7 : 9080 |
| 7 | Kevin | kevin@kkk.com | DSC-K | Kevin-H | 132.126.6.9 : 80/data1 |
| ... | ... | ... | ... | ... | ... |

| ID | Name | Mike | Alice | Julia | Tom | Paul | James | Dan | Kevin |
|---|---|---|---|---|---|---|---|---|---|
| 0 | Mike | – | 0.83 | 0.83 | 0.53 | 0.51 | 0.42 | 0.18 | 0.06 |
| 1 | Alice | 0.83 | – | 0.44 | 0.24 | 0.05 | 0.08 | 0.67 | 0.91 |
| 2 | Julia | 0.83 | 0.44 | – | 0.27 | 0.77 | 0.63 | 0.45 | 0.04 |
| 3 | Tom | 0.53 | 0.24 | 0.27 | – | 0.34 | 0.55 | 0.87 | 0.14 |
| 4 | Paul | 0.51 | 0.05 | 0.77 | 0.34 | – | 0.22 | 0.88 | 0.74 |
| 5 | James | 0.42 | 0.08 | 0.63 | 0.55 | 0.22 | – | 0.71 | 0.65 |
| 6 | Dan | 0.18 | 0.67 | 0.45 | 0.87 | 0.88 | 0.71 | – | 0.62 |
| 7 | Kevin | 0.06 | 0.91 | 0.04 | 0.14 | 0.74 | 0.65 | 0.62 | – |
| ... | ... | ... | ... | ... | ... | ... | ... | ... | ... |

| ID | User name | Address | Owned apparatus ID | Owned apparatus name | Apparatus-unique connection information | State information |
|---|---|---|---|---|---|---|
| 0 | Mike | mike@xxx.com | DSC-X | Mike-A | 133.124.123.1 : 8080 | Off-line |
| 1 | Alice | alice@aaa.com | DSC-Z | Alice-B | 132.167.132.2 : 80/pub | The number of connections: 1 |
| 2 | Julia | julia@jjj.com | TV-J | Julia-C | 143.111.12.3 : 8081 | The number of connections: 0 |
| 3 | Tom | tom@ttt.com | DSC-T | Tom-D | 134.132.13.4 : 8080 | The number of connections: 0 |
| 4 | Paul | paul@ppp.com | CM-P | Paul-E | 133.144.12.5 : 80/contents | Off-line |
| 5 | James | james@yyy.com | DSC-Y | James-F | 143.127.8.6 : 80/www | Off-line |
| 6 | Dan | dan@ddd.com | CM-D | Dan-G | 133.182.24.7 : 9080 | The number of connections: 3 |
| 7 | Kevin | kevin@kkk.com | DSC-K | Kevin-H | 132.126.6.9 : 80/data1 | The number of connections: 0 |
| ... | ... | ... | ... | ... | ... | |

FIG. 17

| ID | Data name | Extension | Type | Apparatus ID | Image capturing date and time | Total time | Reproduction time | Reproduction path |
|---|---|---|---|---|---|---|---|---|
| 1 | C-1 | mp4 | Movie | DSC-X | 2002/10/1 09:15 | 34:05 | 1:00 | C-1.wmv |
| 2 | C-2 | mp4 | Movie | DSC-X | 2002/10/1 10:03 | 5:45 | 1:00 | C-2.wmv |
| 3 | C-3 | mp4 | Movie | DSC-X | 2002/10/1 10:05 | 14:55 | 1:00 | C-3.wmv |
| 4 | C-4 | mp4 | Movie | DSC-X | 2002/10/1 12:32 | 10:03 | 1:00 | C-4.wmv |
| 5 | C-5 | mp4 | Movie | DSC-X | 2002/10/1 12:33 | 4:13 | 1:00 | C-5.wmv |
| 6 | C-6 | mp4 | Movie | DSC-X | 2002/10/1 13:07 | 6:54 | 1:00 | C-6.wmv |
| 7 | C-7 | mp4 | Movie | DSC-X | 2002/10/1 14:44 | 33:22 | 1:00 | C-7.wmv |
| 8 | C-8 | mp4 | Movie | DSC-X | 2002/10/1 19:10 | 45:21 | 1:00 | C-8.wmv |
| 9 | C-9 | mp4 | Movie | DSC-X | 2002/10/2 09:50 | 25:32 | 1:00 | C-9.wmv |
| 10 | C-10 | mp4 | Movie | DSC-X | 2002/10/2 11:22 | 51:02 | 1:00 | C-10.wmv |
| ⋮ | | | | | | | | |

| ID | Data name | Type | Apparatus ID | Total time | Purchase price (YEN) | Relay history | Discount price |
|---|---|---|---|---|---|---|---|
| 1 | PPV-1 | DL-2 | STB-X | 2:00 | 1000 | Julia, Tom | 800 |
| 2 | PPV-2 | DL-1 | STB-X | 2:00 | 1000 | – | 1000 |
| 3 | PPV-3 | DL-2 | STB-X | 1:00 | 500 | Alice | 400 |
| 4 | PPV-4 | DL-3 | STB-X | 0:30 | 300 | Julia, Kevin | 150 |
| 5 | PPV-5 | DL-1 | STB-X | 2:30 | 1000 | Tom, Paul, Dan | 700 |
| 6 | PPV-6 | DL-1 | STB-X | 0:45 | 300 | Dan | 200 |
| 7 | PPV-7 | DL-2 | STB-X | 1:00 | 500 | Kevin | 400 |
| 8 | PPV-8 | DL-2 | STB-X | 1:00 | 500 | – | 500 |
| 9 | PPV-9 | DL-1 | STB-X | 1:30 | 1000 | Tom, Kevin | 800 |
| 10 | PPV-10 | DL-1 | STB-X | 2:00 | 1000 | – | 1000 |
| ... | ... | ... | ... | ... | ... | ... | ... |

FIG. 21

| Type | Provider | Obtainer | Charge calculation method (Discount limit: half of regular price, Regular price: 100) |
|---|---|---|---|
| DL-1 | Applicable | Not applicable | Discount price for provider = Regular price for provider - (Regular price) × The number of viewers of content provided or relayed |
| DL-2 | Applicable | Applicable | Discount price for provider = Regular price for provider - (Regular price) × The number of viewers of content provided or relayed<br>Discount price for obtainer = Regular price for provider - (Regular price) × The number of viewers of content provided or relayed |
| DL-3 | Not applicable | Applicable | Discount price for obtainer = Regular price for provider - (Regular price) × The number of viewers of content provided or relayed |

CONTENT SHARING SYSTEM AND METHOD, CONTENT RELAYING APPARATUS AND METHOD, AND CONTENT PROVIDING APPARATUS AND METHOD

TECHNICAL FIELD

The present invention relates to a content sharing system including: a content providing apparatus which is capable of providing content data; a content obtaining apparatus which obtains the content data from the content providing apparatus through a network; and a content relaying apparatus which relays network connection between the content obtaining apparatus and the content providing apparatus.

BACKGROUND OF THE INVENTION

Background Art

Recent years have seen advancement in functions of imaging devices such as consumer-use digital still cameras, video cameras, and cameras built into mobile phones. Such imaging devices support, for example, highly technical imaging such as high-speed sequential imaging, in addition to recording of high-quality photographs and videos. In addition, such imaging devices automatically assign meta information such as location information of an image capturing place and the name of a person whose image is included in a photograph or a video. Furthermore, for example, each of such imaging devices has a network connection function and directly uploads captured photographs onto a server on a network. Such various kinds of highly functional imaging devices are available at low prices.

The spread of such highly functional imaging devices is a cause of increase in the number of private contents (photographs captured in family travels and athletics meets, or videos captured in presentations). Furthermore, increase in the image quality and added value of contents dramatically increases the number of contents and the size of each of the contents.

As such, in order to share captured photographs or videos between family members, relatives, friends, or people who attended events, an image-capturing person sends the photograph data or the video data to the family members or the like, for example, directly by e-mail using an electric mail function of a personal computer. Alternatively, for example, the image-capturing person uploads the photograph data or the video data to a server on a network using a content sharing service that is provided through the Internet, so as to allow the browsers to download the photograph data or the video data.

Such an operation increases the operation cost on the user more significantly as the number of addresses increases. For this reason, with an aim to reduce such an operation, a scheme has been proposed which is for realizing sharing of contents by uploading data to a distribution server directly from a mobile phone that is an imaging device, and by authenticating browsers based on a user list (for example, see Patent Literature 1).

CITATION LIST

Patent Literature

[PTL 1]
Japanese Unexamined Patent Application Publication No. 2006-332990

SUMMARY OF INVENTION

However, the content sharing system described in Patent Literature 1 requires that the whole content data that should be shared be stored in the distribution server. For this reason, a larger amount of content data increases more significantly communication cost and time required to upload content data from a device owned by a user to a distribution server. Furthermore, the user must secure device resources required to upload the content data. A larger amount of content data also requires a larger storage capacity for a storage device (a network storage) at a server side that is considered as requiring a comparatively high cost. In short, the conventional content sharing system has a problem of increasing a communication cost and a processing load when sharing a comparatively large amount of content data.

The present invention has been made in order to solve the above-described problems, and aims to provide a content sharing system capable of reducing such a communication cost and processing load when sharing content data between a plurality of apparatuses.

In order to solve the above-described problems, a content sharing system according to an aspect of the present invention includes: a content providing apparatus which is capable of providing content data; a content obtaining apparatus which obtains the content data from the content providing apparatus through a network; and a content relaying apparatus which relays network connection between the content obtaining apparatus and the content providing apparatus, wherein the content relaying apparatus includes: a social information managing unit configured to obtain a familiarity degree indicating familiarity between a user of the content providing apparatus and a user of the content obtaining apparatus with reference to social information including the familiarity degree between the users, when the content relaying apparatus receives, from the content obtaining apparatus, a first data obtainment request for obtainment of the content data; and a provision and relay determining unit configured to transmit, to the content obtaining apparatus, connection information for enabling the content obtaining apparatus to establish network connection with the content providing apparatus, when the familiarity degree is larger than or equal to a threshold value, the content obtaining apparatus includes an obtainment determining unit configured to transmit, to the content providing apparatus, a second data obtainment request for transmission of the content data, using the connection information, when the content obtaining apparatus transmits the first data obtainment request to the content relaying apparatus and then receives the connection information from the content relaying apparatus, and the content providing apparatus includes an external-provision determining unit configured to transmit the content data to the content obtaining apparatus, when the content providing apparatus receives the second data obtainment request from the content obtaining apparatus.

With this structure, whether data can be provided or not is determined based on a familiarity degree between a user who provides the content data and a user who obtains the content data. The content data is directly transmitted from the content providing apparatus to the content obtaining apparatus. For this reason, for example, it is possible to reduce the size of a storage area for storing content data in a server in a network service for the purpose of sharing content data. The user who provides the content data can reduce the operation cost (such as an operation of uploading the content data). Furthermore, since the content data is directly provided without a server, it is also possible to reduce the communication cost. Furthermore, the content data is provided only to users who are in a close relationship with the provider, it is possible to reduce unauthorized access to and leakage of the content data.

In addition, preferably, the second data obtainment request includes user information indicating the user of the content obtaining apparatus, and the external-provision determining unit is configured to obtain, from the content relaying apparatus, the familiarity degree between the user indicated by the user information and the user of the content providing apparatus, and to transmit the content data to the content obtaining apparatus such that transmission of the content data is given a higher priority when the familiarity degree is higher.

With this structure, in the case of reception of a plurality of second data obtainment requests for requesting obtainment of at least one content data item, a priority is placed on provision of the content data to an obtainment-requesting user who has a high familiarity degree with the providing user. For this reason, it is possible to preferentially provide content data of a high grade or a high image quality to a user having a higher familiarity degree, and to provide content data of a low grade or a low image quality to a user having a lower familiarity degree. Alternatively, it is possible to put, in a queue, provision of content data to a user having a comparatively low familiarity degree. In other words, it is possible to control provision priority appropriately, and thus to reduce the communication cost and the processing load of the content providing apparatus.

In addition, preferably, the content providing apparatus further includes a state notifying unit configured to transmit state information indicating a state of the content providing apparatus to the content relaying apparatus, and the provision and relay determining unit is configured to transmit the connection information to the content obtaining apparatus, based on the state information received from the content providing apparatus.

With this structure, it is possible to transmit the connection information according to a state of the content providing apparatus. In other words, when the state of the content providing apparatus is a state undesirable for provision of the content data, it is possible to disable transmission of the connection information for connection to the content providing apparatus. Accordingly, it is possible to reduce the number of cases where the content obtaining apparatus fails to obtain the content data from the content providing apparatus.

In addition, preferably, the content providing apparatus further includes a content modifying unit configured to modify the content data to generate modified content data that is smaller in data amount than the content data, the external-provision determining unit is further configured to transmit the modified content data to the content relaying apparatus, and the provision and relay determining unit is further configured to store the modified content data into a content data storage unit, and to transmit the modified content data to the content obtaining apparatus, wherein the content obtaining apparatus further includes: an output unit configured to display the modified content data; and an input unit configured to receive, from the user, an obtainment instruction for obtaining the content data corresponding to the modified content data, and the obtainment determining unit is configured to transmit the first data obtainment request to the content relaying apparatus according to the received obtainment instruction.

With this structure, it is possible to modify the content data to generate modified content data having a data amount smaller than the data amount of the content data. For this reason, the content relaying apparatus can reduce the capacity of a storage area for recording the modified content data more significantly in this case than in the case of storing the raw content data. In addition, the user of the content obtaining apparatus can check the details of the content data by viewing the modified content data. Accordingly, the user can understand the details of the content data more easily than in the case of selecting the content data by text. As a result, it is possible to reduce the number of cases where the user selects different content data.

In addition, preferably, the content modifying unit is configured to obtain an available capacity in the content data storage unit from the content relaying apparatus, and to generate the modified content data such that a data amount of the modified content data is changed depending on the available capacity.

With this structure, it is possible to automatically generate the modified content data according to the available capacity of the content data storage unit. For this reason, it is possible to reduce the time required for such upload and to reduce the communication cost more significantly than in the case of uploading the whole content. Furthermore, since there is no need to prepare a storage area for storing the whole content data, it is possible to reduce the capacity of the storage area for storing the content data.

In addition, preferably, the content modifying unit is configured to obtain, from the content relaying apparatus, a familiarity degree of an other user with respect to the user of the content providing apparatus, and to generate the modified content data, based on the familiarity degree.

With this structure, it is possible to generate the modified content data adapted to the user having a high familiarity degree. Accordingly, the user having the high familiarity degree who is highly likely to request obtainment of the content data can easily check the details of the content data. As a result, it is possible to reduce the number of cases where different content data is selected.

In addition, preferably, the content data is video data including a plurality of pictures, and the content modifying unit is configured to generate the modified content data such that the modified content data includes a greater number of pictures in each of which an image of the other user is included when the familiarity degree of the other user is higher.

With this structure, the user who is highly likely to request obtainment of the content data can check the details of the content data more easily. As a result, it is possible to reduce the number of cases where different content data is selected.

In addition, preferably, the external-provision determining unit is configured to prioritize transmission of the content data when the content data has never been provided to the content obtaining apparatus than when the content data has been previously provided to the content obtaining apparatus.

With this structure, it is possible to lower the priority when the same user tries to obtain the same content data once again.

In addition, preferably, the provision and relay determining unit is further configured to distribute the content data to the content providing apparatus, and the content relaying apparatus further includes a charge managing unit configured to change at least one of a price charged to the user of the content providing apparatus and a price charged to the user of the content obtaining apparatus, according to history that the content providing apparatus transmitted the content data to an other content obtaining apparatus according to connection information.

With this structure, it is possible to change a charge price to an appropriate charge price as necessary according to the provision and relay history of the content data between the users. For this reason, for example, it is possible to apply a discount (such as a 30% discount in the case of provision to three users) according to the number of users to which the content data is provided. In addition, it is also possible to apply, to a user of the content obtaining apparatus that obtains the target content data from the content providing apparatus, a price obtained by subtracting a price corresponding to a reduction in the processing load of the content relaying apparatus from a regular price that is charged in the case of obtainment from the content relaying apparatus.

In addition, preferably, the content relaying apparatus further includes an advertisement providing unit configured to generate advertisement data relating to the content data, based on the history that the content providing apparatus transmitted the content data to the other content obtaining apparatus according to the connection information, and to transmit the generated advertisement data to the content obtaining apparatus.

With this structure, it is possible to distribute, to devices on a network, advertisement data generated based on the history that the content providing apparatus transmitted the content data to the content obtaining apparatus. Accordingly, it is possible to distribute the advertisement data on which the after-change charge price is already reflected, and to thereby increase the userfriendliness.

In addition, the present invention can be implemented as the content relaying apparatus or the content providing apparatus. In addition, the aforementioned content relaying apparatus or the content providing apparatus can be implemented as an integrated circuit.

As described above, the present invention can be implemented as the content sharing system, the content relaying apparatus, or the content providing apparatus. In addition, the present invention can be realized as a content sharing method, a content relaying method, or a content providing method either of which has the steps corresponding to the unique structural elements of the content sharing system, the content relaying apparatus, or the content providing apparatus. In addition, the present invention can be realized as a program for causing a computer to execute these steps of the content relaying method or the content providing method. Such a program can naturally be distributed via recording media such as CD-ROMs or transmission media such as the Internet.

According to the present invention, whether data can be provided or not is determined based on a familiarity degree between a user who provides the content data and a user who obtains the content data.

The content data is directly transmitted from the content providing apparatus to the content obtaining apparatus. For this reason, for example, it is possible to reduce the size of a storage area for storing content data in a server in a network service for the purpose of sharing content data. The user who provides the content data can reduce the operation cost (such as an operation of uploading the content data). Furthermore, since the content data is directly provided without a server, it is also possible to reduce the communication cost. Furthermore, the content data is provided only to users in a close relationship with the provider, it is possible to reduce cases of unauthorized access to and leakage of the content data.

BRIEF DESCRIPTION OF DRAWINGS

FIG. 5 is a diagram showing exemplary index data in Embodiment 1 of the present invention.

FIG. 6A is a diagram showing exemplary social information in Embodiment 1 of the present invention.

FIG. 6B is a diagram showing exemplary social information in Embodiment 1 of the present invention.

FIG. 14 is a diagram of an exemplary user information table in Variation 2 of Embodiment 1 of the present invention.

FIG. 17 is a diagram showing exemplary index data in Variation 3 of Embodiment 1 of the present invention.

FIG. 20 is a diagram showing exemplary provision and relay history data in Embodiment 2 of the present invention.

FIG. 21 is a diagram showing an exemplary charge change table in Embodiment 2 of the present invention.

DETAILED DESCRIPTION OF INVENTION

Hereinafter, embodiments of the present invention are described with reference to the drawings. In the following embodiments, the same structural elements are assigned with the same numerical references, and the same descriptions thereof are not repeated.

Each of the following embodiments described below shows a preferred specific example of the present invention. In other words, the numerical values, shapes, materials, structural elements, the arrangement and connection of the structural elements, steps, the processing order of the steps etc. shown in the following exemplary embodiments are mere examples, and therefore do not limit the present invention. The present invention is defined based on the descriptions in the Claims. Accordingly, among the structural elements in the following exemplary embodiments, structural elements not recited in any one of the independent claims defining the most generic part of the present invention are not always necessary for achieving the aim of the present invention although these structural elements are described as structural elements of preferred embodiments.

[Embodiment 1]

Figure 1:
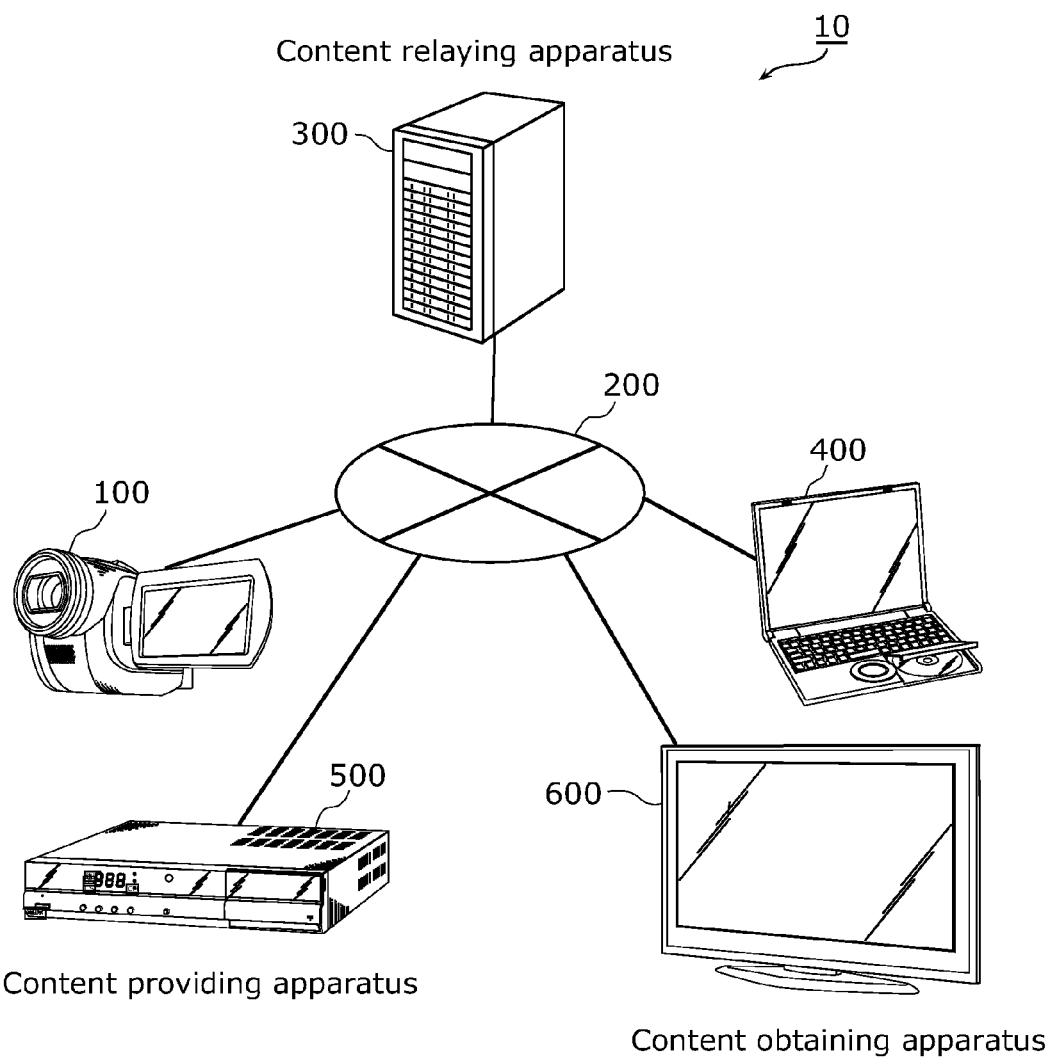
FIG. 1 is an illustration of a configuration of a content sharing system according to Embodiment 1 of the present invention.

FIG. 1 is an illustration of a configuration of a content sharing system 10 according to Embodiment 1 of the present invention. As shown in FIG. 1, the content sharing system 10 includes a content providing apparatus 100, a content relaying apparatus 300, a content obtaining apparatus 400, a content providing apparatus 500, and a content obtaining apparatus 600. These content providing apparatus 100, content relaying apparatus 300, content obtaining apparatus 400, content providing apparatus 500, content obtaining apparatus 600 are connected to each other via a network 200.

The content providing apparatus 500 is similar to the content providing apparatus 100, and thus descriptions of the content providing apparatus 500 are skipped as necessary below. Likewise, the content obtaining apparatus 600 is similar to the content obtaining apparatus 400, and thus descriptions of the content obtaining apparatus 600 are skipped as necessary below.

The content providing apparatus 100 is an apparatus which is capable of providing content data. Such content data include image data of photographs or videos, or audio data, or a combination thereof.

More specifically, the content providing apparatus 100 is, for example, a video recorder or a home server which can mount an external storage media having image data recorded thereon. In addition, the content providing apparatus 100 is, for example, a digital still camera which is capable of capturing still images or a digital video camera which is capable of capturing videos.

The content relaying apparatus 300 is an apparatus which relays provision of contents. More specifically, the content obtaining apparatus 400 is, for example, a Web server. The content relaying apparatus 300 relays network connection between the content obtaining apparatus 400 and the content providing apparatus 100.

The content obtaining apparatus 400 is an apparatus which requests obtainment of the content data. More specifically, the content obtaining apparatus 400 is, for example, a video recorder, a home server, or a mobile terminal. The content obtaining apparatus 400 obtains content data from the content providing apparatus 100 that is connected through a network 200.

Next, the main functional structure of each of these content providing apparatus 100, content relaying apparatus 300, and content obtaining apparatus 400 are described with reference to corresponding one of FIG. 2 to FIG. 4.

Figure 2:
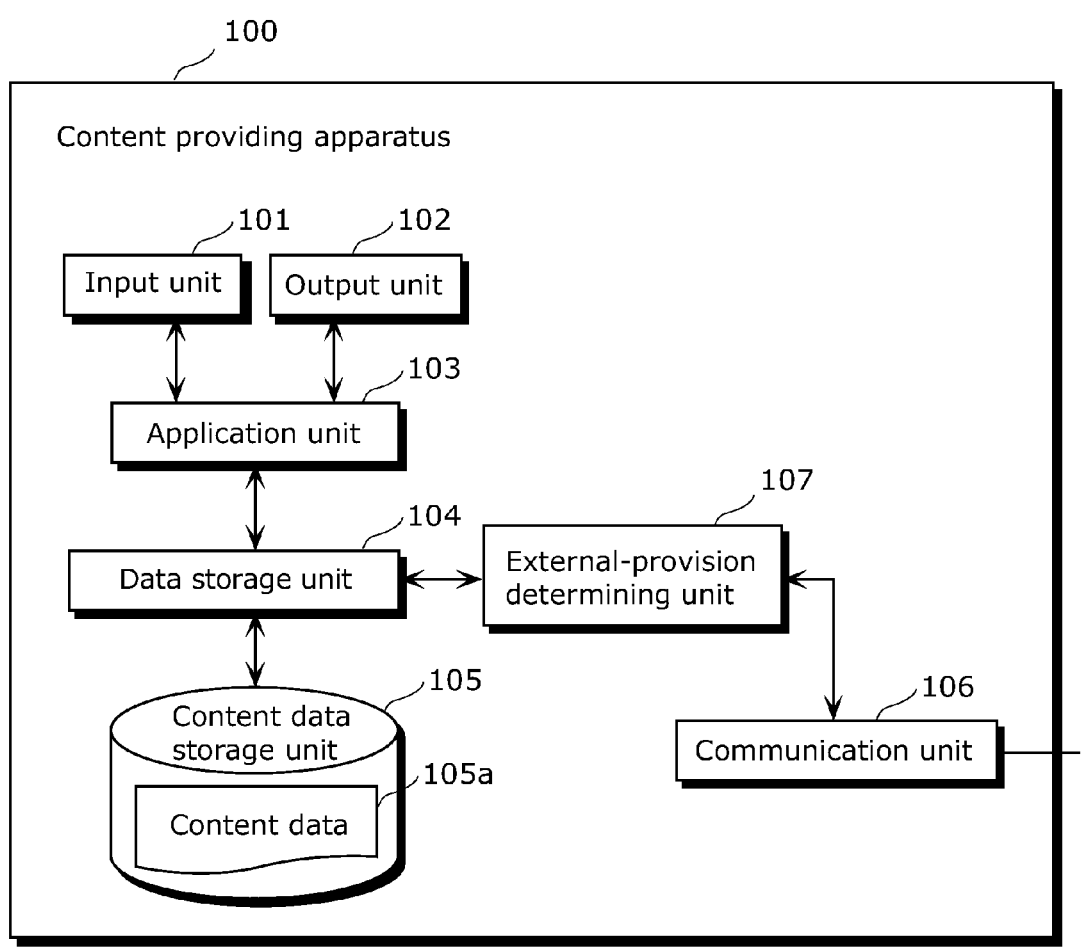
FIG. 2 is a block diagram of a functional structure of a content providing apparatus according to Embodiment 1 of the present invention.

FIG. 2 is a block diagram of a functional structure of a content providing apparatus 100 according to Embodiment 1 of the present invention. As shown in FIG. 2, the content providing apparatus 100 includes an input unit 101, an output unit 102, an application unit 103, a data storage unit 104, a content data storage unit 105, a communication unit 106, and an external-provision determining unit 107.

The input unit 101 obtains content data using an input means (such as an interface with an external storage medium or an embedded camera module) that is mounted on the content providing apparatus 100. The input unit 101 transfers the obtained content data to the data storage unit 104 via the application unit 103.

The output unit 102 outputs various kinds of data. For example, the output unit 102 outputs the content data obtained by the input unit 101 to a display apparatus.

The data storage unit 104 stores, into the content data storage unit 105, content data 105a transferred from the input unit 101.

The content data storage unit 105 is, for example, a hard disk or a flash memory. The content data storage unit 105 records, in a re-readable format, the content data 105a which can be provided to the content obtaining apparatus 400 through the network 200.

The application unit 103 is a processing unit having various kinds of functions that are used by a user of the content providing apparatus 100 (these functions are, for example, a content viewer function, a slide show reproduction function, or a print output function). More specifically, the application unit 103 realizes the various kinds of functions according to an instruction that is received from the user through the input unit 101. For example, the application unit 103 reads the content data 105a recorded in the content data storage unit 105 at an arbitrary timing, and execute desired processing.

The communication unit 106 is a communication interface for communication with a server or an apparatus such as a terminal on the network 200. More specifically, for example, the communication unit 106 communicates communication packets with the content relaying apparatus 300 or the content obtaining apparatus 400.

The external-provision determining unit 107 reads the content data 105a from the content data storage unit 105, and generates index data. The index data is data indicating the outline of the content data that can be provided to the external device (such as the content obtaining apparatus 400) through the communication unit 106.

Furthermore, the external-provision determining unit 107 determines whether or not to provide the content data 105a to the external device according to the information received from the external device. In this embodiment, the external-provision determining unit 107 transmits the content data 105a to the content obtaining apparatus 400 when the second data obtainment request is received from the content obtaining apparatus 400.

Figure 3:
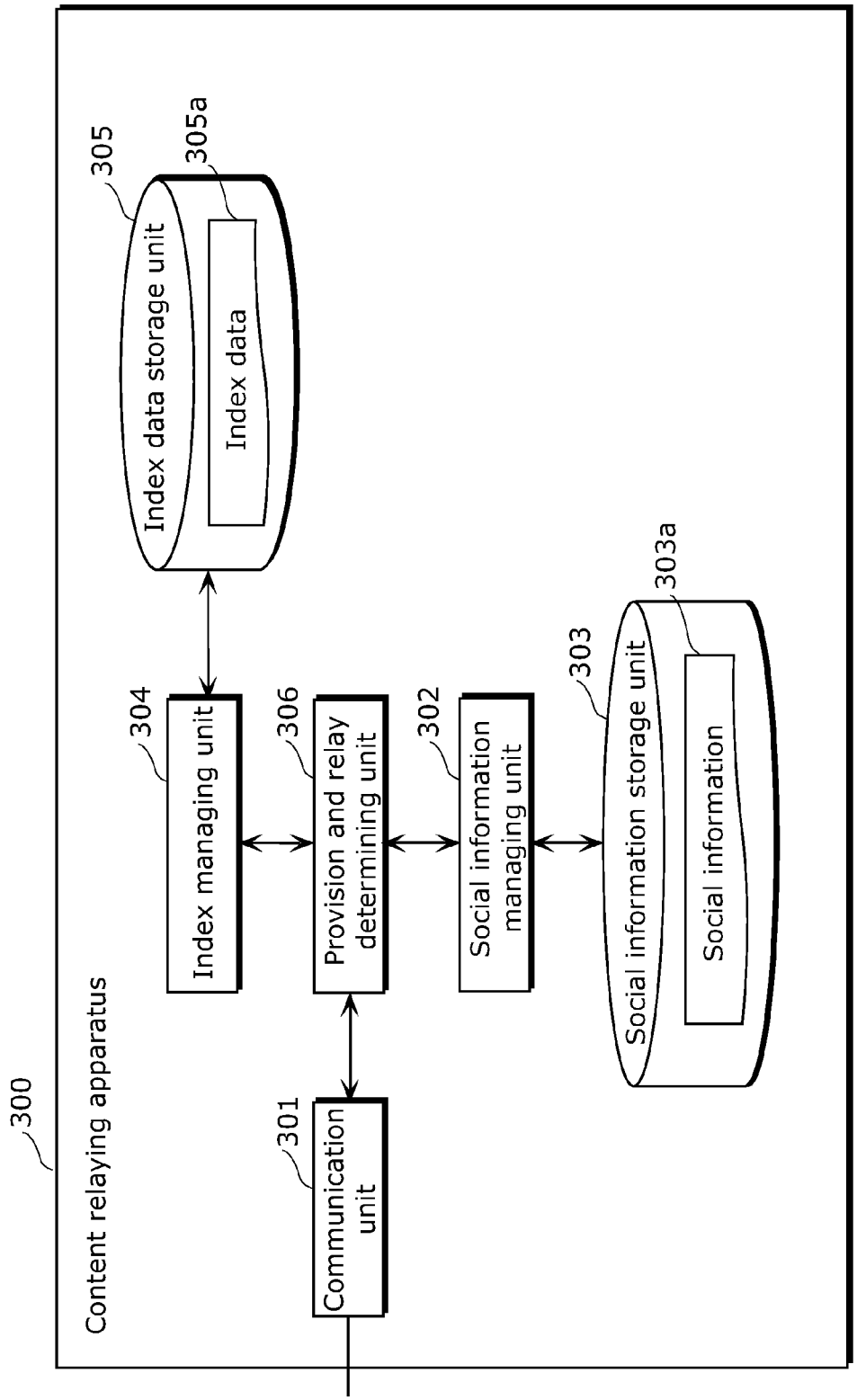
FIG. 3 is a block diagram of a functional structure of a content relaying apparatus according to Embodiment 1 of the present invention.

FIG. 3 is a block diagram of a functional structure of a content relaying apparatus 300 according to Embodiment 1 of the present invention. As shown in FIG. 3, the content relaying apparatus 300 includes a communication unit 301, a social information managing unit 302, a social information storage unit 303, an index managing unit 304, an index data storage unit 305, and a provision and relay determining unit 306.

The communication unit 301 is similar to the communication unit 106 included in the content providing apparatus 100, and is a communication interface for communication with a server or an apparatus such as a terminal on the network 200.

The social information managing unit 302 manages social information 303a. More specifically, the social information managing unit 302 obtains a familiarity degree between the user of the content providing apparatus 100 and the user of the content obtaining apparatus 400, with reference to the social information 303a stored in the social information storage unit 303.

The social information 303a includes familiarity degrees indicating relationships between users and familiarity between the users. The social information 303a is described later in detail with reference to FIG. 6A and FIG. 6B.

The index managing unit 304 receives, via the communication unit 301, the index data generated by the external-provision determining unit 107 of the content providing apparatus 100. The index managing unit 304 stores the received index data 305a in the index data storage unit 305.

When the content obtaining apparatus 400 receives the first data obtainment request from the later-described content obtaining apparatus 400, the provision and relay determining unit 306 determines whether the content obtaining apparatus 400 can use the content data 105a of the content providing apparatus 100, with reference to the social information 303a and the index data 305a. The provision and relay determining unit 306 transmits the connection information to the content obtaining apparatus 400 according to the result of the determination.

In other words, the provision and relay determining unit 306 transmits the connection information to the content obtaining apparatus 400 when the familiarity degree between the user of the content providing apparatus 100 and the user of the content obtaining apparatus 400 is larger than or equal to a threshold value. This connection information is information for enabling the content obtaining apparatus 400 to establish network connection with the content providing apparatus 100. More specifically, the connection information includes address information of the content providing apparatus 100 on the network 200. For example, the connection information may include authentication information for connecting to the content providing apparatus 100.

Figure 4:
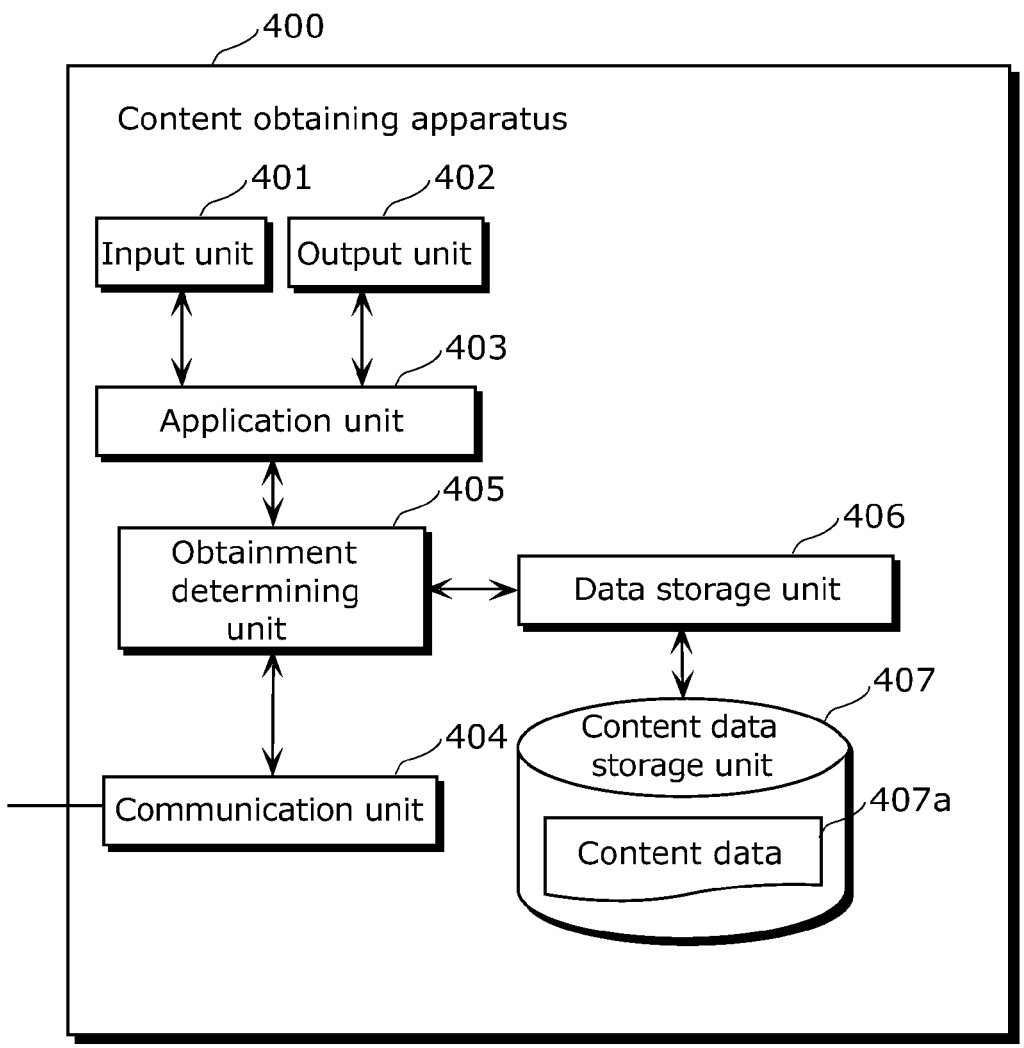
FIG. 4 is a block diagram of a functional structure of a content obtaining apparatus according to Embodiment 1 of the present invention.

FIG. 4 is a block diagram of a functional structure of a content obtaining apparatus 400 according to Embodiment 1 of the present invention. As shown in FIG. 4, the content obtaining apparatus 400 includes an input unit 401, an output unit 402, an application unit 403, a communication unit 404, an obtainment determining unit 405, a data storage unit 406, and a content data storage unit 407.

The input unit 401 receives an instruction from a user through an input means (such as a touch panel for operation or a button) mounted on the content obtaining apparatus 400. More specifically, the input unit 401 receives, for example, the instruction for selecting the content data that is the obtainment target. The input unit 401 gives the instruction for executing processing to the application unit 403, based on the received instruction.

The output unit 402 outputs a user interaction display screen or a response sound for enabling the user to give an instruction for execution of the processing to the application unit 403. More specifically, the output unit 402 outputs a GUI (Graphical User Interface) for selecting content data based on the index data received from the content relaying apparatus 300.

The application unit 403 is a processing unit having various kinds of functions that are used by a user of the content obtaining apparatus 400 (these functions are, for example, a content viewer function, a slide show reproduction function, or a print output function). More specifically, the application unit 403 realizes the various kinds of functions according to an instruction that is received from the user through the input unit 401.

The communication unit 404 is similar to the communication unit 106 included in the content providing apparatus 100, and is a communication interface for communication with a server or an apparatus such as a terminal on the network 200.

The obtainment determining unit 405 transmits the first data obtainment request to the content relaying apparatus 300 via the communication unit 404, and determines whether or not to obtain the content data based on the result of the response to the request. More specifically, the obtainment determining unit 405 transmits the first data obtainment request to the content relaying apparatus 300. The obtainment determining unit 405 transmits the second data obtainment request for requesting transmission of the content data to the content providing apparatus 100, using the connection information when the connection information is received from the content relaying apparatus 300.

The data storage unit 406 stores the received content data 407a in the content data storage unit 407 when the obtainment determining unit 405 obtains the content data.

The content data storage unit 407 is, for example, a hard disk or a flash memory. The content data storage unit 407 stores the content data 407a in a re-readable format. Next, the application unit 403 reads the content data 407a recorded in the content data storage unit 407 at an arbitrary timing, and execute desired processing.

Next, the index data 305a and social information 303a stored in the content relaying apparatus 300 are described with reference to FIG. 5, FIG. 6A, and FIG. 6B.

FIG. 5 is a diagram showing exemplary index data 305a in Embodiment 1 of the present invention. As shown in FIG. 5, the index data 305a stores meta information indicating the outline of the content data in association with an identifier for identifying the content data that can be provided to an external device. More specifically, the index data 305a includes, in association with ID, data names, an extension, a type, apparatus ID, image capturing dates and times, and total times.

This index data 305a is generated by the external-provision determining unit 107 of the content providing apparatus 100, and is transmitted to the content relaying apparatus 300.

The data names are information necessary for access to the content data. The data names may be called as object identifiers or data paths.

The extension indicates the format type of files. In FIG. 5, "mp4" indicating video is stored. The type indicates the type of the content data 105a. In FIG. 5, only "Movie" indicating video used for simple explanation is stored. The apparatus ID is an identifier that is uniquely assigned to the apparatus which generated the content data 105a. In FIG. 5, for simple explanation, the apparatus ID is represented as a character string "DSC-X" that identifies the apparatus. The image capturing dates and times show time points at which items of the content data 105a were generated. The total times are total (reproduction) times of the videos.

Each of FIG. 6A and FIG. 6B is a diagram showing exemplary social information 303a in Embodiment 1 of the present invention. More specifically, FIG. 6A is a diagram showing an exemplary user information table included in the social information 303a. In addition, FIG. 6B is a diagram showing an exemplary social information table included in the social information 303a.

As shown in FIG. 6A, the user information table stores information about users. More specifically, the user information table includes, in association with the identifiers (ID) for identifying the users, the user names, addresses, owned apparatus ID, owned apparatuses, and apparatus-unique connection information.

The user names are the names or nicknames of the users. The addresses are information for communicating information to the users using electric mail. The owned apparatus ID is an identifier (for example, the identifier of the content providing apparatus 100 owned by one of the users) that is assigned uniquely to the apparatus that is owned or used by the user identified by the owned apparatus ID. The owned apparatus name is the apparatus name (for example, "Mike-A" of the apparatus owned by the user whose user name is "Mike") that is identified by the owned apparatus ID. The apparatus-unique connection information is information necessary for establishing network connection to the apparatus identified by the ID. Examples of the apparatus-unique connection information described here are global IP addresses, port numbers, initial connection paths which are necessary for establishing connection to the apparatus via the network 200.

In addition, as shown in FIG. 3B, the social information table stores relationships and familiarity degrees indicating familiarity between users. Here, each of the relationships indicates whether or not the target user (the owner of the social information) and a corresponding one of the other users know each other in the real world. In addition, familiarity means familiarity of the social information owner with each of the users who has a relationship with the social information owner. Here, the familiarity degree is set when the owner has a relationship with the user such that the value of the familiarity degree is higher when the owner is more familiar with the user.

Here, the familiarity degree may be set, for example, based on the number of messages communicated between the users in a social networking service. In addition, for example, the familiarity degree may be set based on the number of particular characters (such as emoticons) in the messages communicated between the users.

For example, in the social information table in FIG. 6B, the social information owners are represented in the vertical direction, and the users who evaluate each of the social information owners are represented in the horizontal direction. The similarity degrees are managed as numerical values each of which is 0 or larger and less than 1.

Here, when users do not know each other (in other words, these users has no relationship), the familiarity degree is represented as "0" or "a numerical value close to 0". In FIG. 6B, when the user whose user name is "Mike" identified as ID "0" is the social information owner, "Mike" and "Alice" know each other, and the familiarity between "Mike" and "Alice" is "0.83". Furthermore, the familiarity degree between "Mike" and "Julia" is "0.83", and the familiarity degree between "Mike" and "Tom" is "0.53". Accordingly, it is shown that "Mike" is more familiar with "Alice" and "Julia" with respect to which the numerical values of the familiarity degrees are larger than the numerical value of the familiarity degree with respect to "Tom".

Here, the cell as a cross point between the row on which the social information owner is "Mike" and the column on which the user who evaluates "Mike" is "Mike" stores "-" (this symbol indicates that no numerical value needs to be input) as the numerical value indicating the familiarity degree. Furthermore, assuming that one of the users other than "Mike" is the social information owner (for example, assuming that the user whose name is "Alice" identified by ID "1" is the social information owner), the social information table can be used to manage numerical values indicating the familiarity degrees between the social information owner and the users who evaluate the owner.

Here, the familiarity degree is represented as a normalized numerical value that is 0 or larger and less than 1. However, the familiarity degree does not always need to be represented as such. For example, the familiarity degree may be converted into a numerical value using a point system in which a point is added without placing the upper limit when a predetermined condition is satisfied. In addition, the familiarity degrees may be grouped into classifications (such as A to E) on plural grades, and represented using the classifications.

Figure 7:
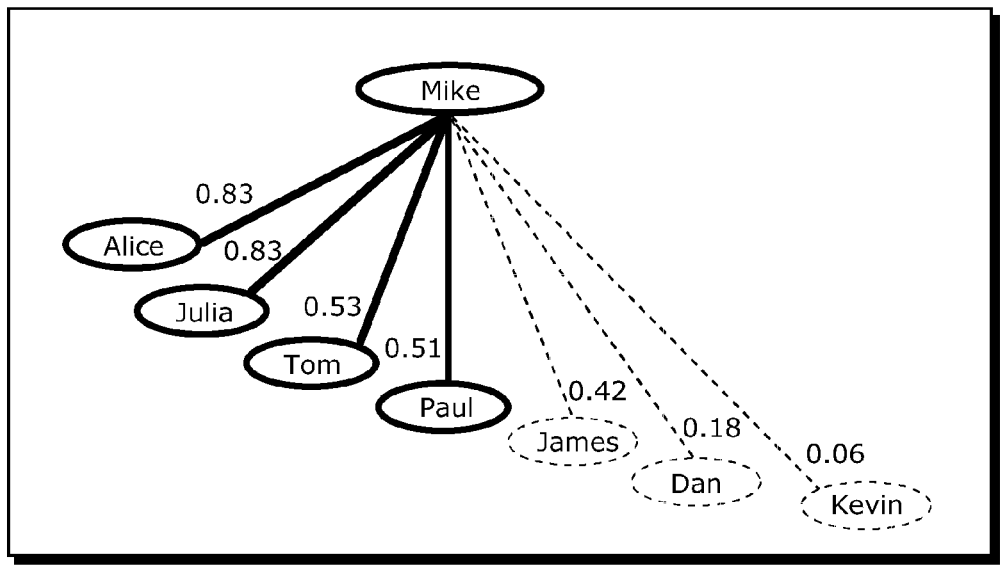
FIG. 7 is a diagram illustrating the concept of nodes in social information in Embodiment 1 of the present invention.

FIG. 7 is a diagram illustrating the concept of nodes in social information in Embodiment 1 of the present invention. In addition, FIG. 8 is a diagram showing an exemplary priority determination threshold value table in Embodiment 1 of the present invention.

As shown in FIG. 7, the social information represents, by numerical values indicating the familiarity degrees, the familiarity of the social information owner "Mike" with respect to each of the other users. Here, a larger numerical value (closer to 1) shows a closer relationship, and a smaller numerical value (closer to 0) shows a more distant relationship.

Figure 8:
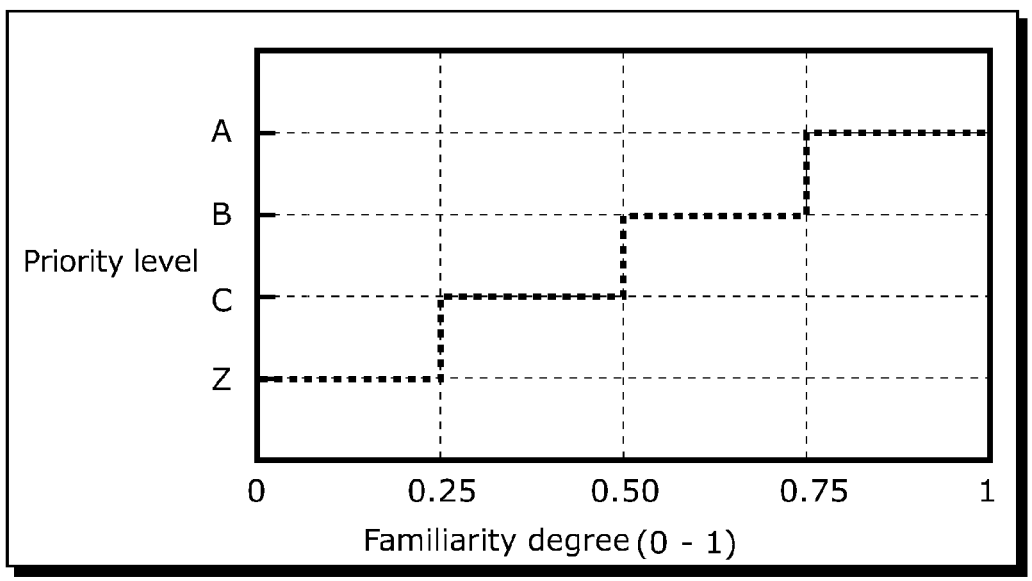
FIG. 8 is a diagram showing an exemplary priority determination threshold value table in Embodiment 1 of the present invention.

A priority determination threshold value table shown in FIG. 8 is a table that is held inside the external-provision determining unit 107 or the provision and relay determining unit 306. The priority levels according to which data is provided to the respective users are calculated based on the familiarity degrees in the priority determination threshold value table in which threshold value is set for use. For example, in FIG. 8, the priority levels are composed of four grades of A to C, and Z. For example, as shown in FIG. 7, both of the familiarity degree between "Mike" and "Alice" and the familiarity degree between "Mike" and "Julia" are "0.83", the priority levels of "Alice" and "Julia" are "A". In addition, the familiarity degree between "Mike" and "Tom" is "0.53", and the familiarity degree between "Mike" and "Paul" is "0.51", and the priority levels of "Tom" and "Paul" are "B".

Next, a description is given of various kinds of operations that are performed by the content sharing system 10 configured as described above.

Figure 9:
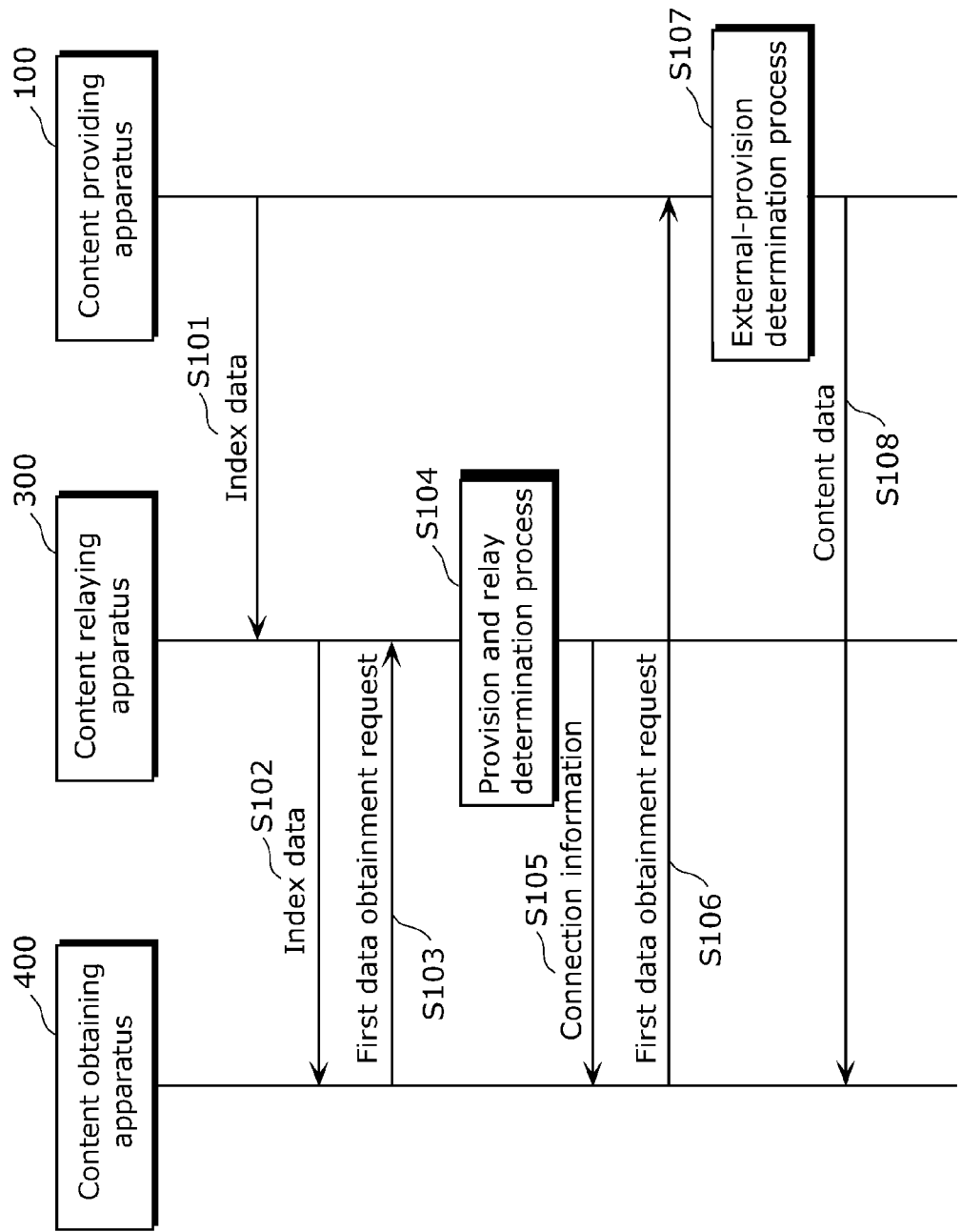
FIG. 9 is a sequence diagram showing a flow of information items in a content sharing system according to Embodiment 1 of the present invention.

FIG. 9 is a sequence diagram showing a flow of information items in the content sharing system 10 according to Embodiment 1 of the present invention.

First, the external-provision determining unit 107 of the content providing apparatus 100 generates index data showing the outline of the content data that can be provided, and transmit the index data to the content relaying apparatus 300 (S101). The index managing unit 304 of the content relaying apparatus 300 stores the received index data in the index data storage unit 305. The index managing unit 304 transmits the index data 305a stored in the index data storage unit 305 to the content obtaining apparatus 400 (S102).

The application unit 403 of the content obtaining apparatus 400 generates a GUI for enabling the user to select at least one of the content data items shown by the received index data 305a. The output unit 402 outputs the generated GUI onto a display screen. Subsequently, the obtainment determining unit 405 transmits a first data obtainment request to the content relaying apparatus 300 according to an instruction received from the user through the input unit 401 (S103).

The provision and relay determining unit 306 of the content relaying apparatus 300 executes provision and relay determination processing (S104). The details of the provision and relay determination processing are described later with reference to FIG. 10. When connection information is determined to be transmitted in the provision and relay determination processing, the provision and relay determining unit 306 transmits, to the content obtaining apparatus 400, the connection information for enabling the content obtaining apparatus 400 to establish network connection with the content providing apparatus 100 (S105).

Using the received connection information, the obtainment determining unit 405 of the content obtaining apparatus 400 transmits a second data obtainment request to the content providing apparatus 100 (S106). The external-provision determining unit 107 of the content providing apparatus 100 executes external-provision determination processing according to the received second data obtainment request (S107). In this embodiment, the external-provision determining unit 107 determines, for example, whether or not it is good to transmit the content data to the content obtaining apparatus 400, based on the second data obtainment request.

Lastly, the external-provision determining unit 107 transmits the content data to the content obtaining apparatus 400 according to the result of the determination (S108).

Figure 10:
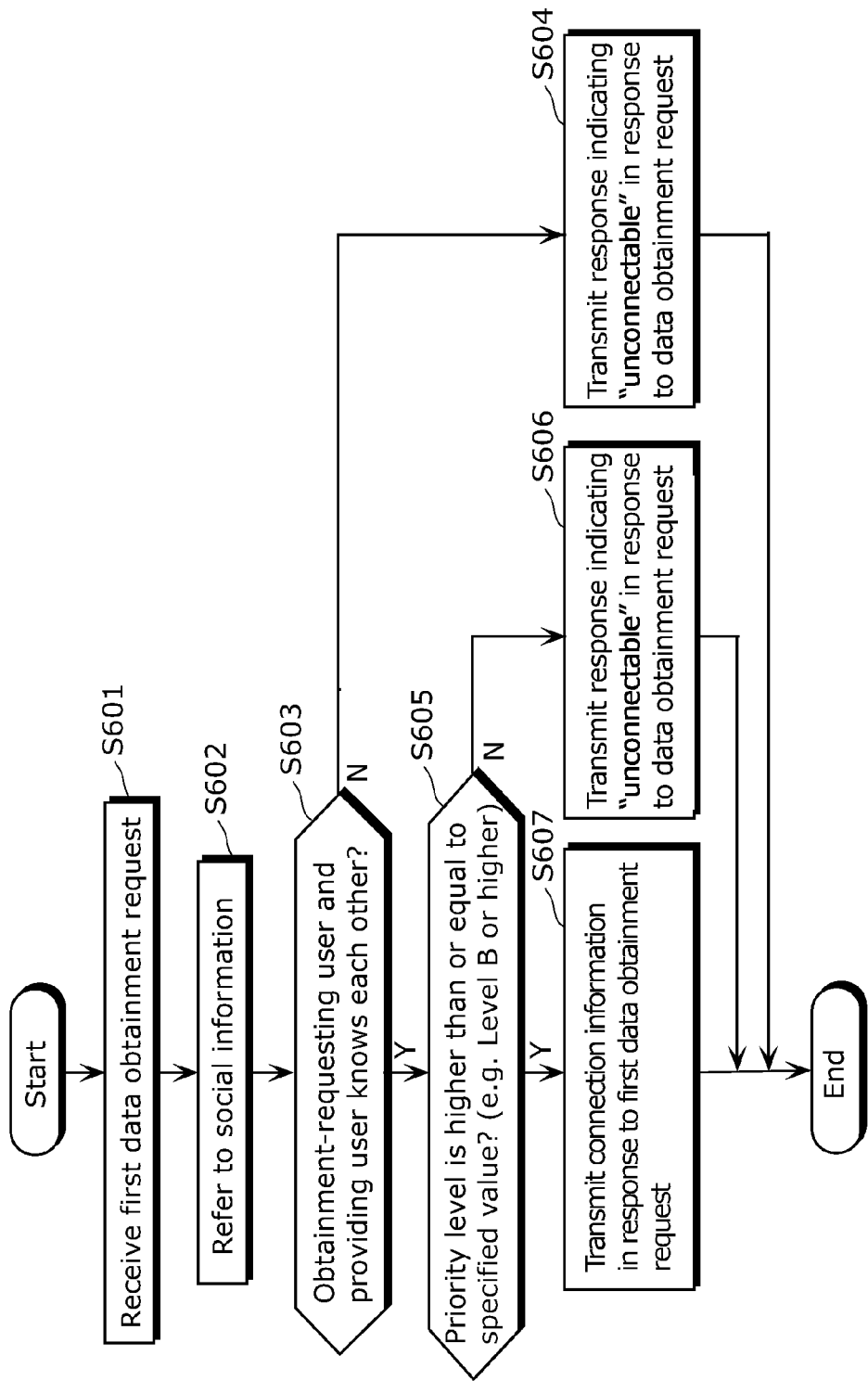
FIG. 10 is a flowchart of provision and relay determination processes according to Embodiment 1 of the present invention.

Next, with reference to FIG. 10, a description is given of a flow of provision and relay determination processing by the provision and relay determining unit 306 of the content relaying apparatus 300.

FIG. 10 is a flowchart of provision and relay determination processes according to Embodiment 1 of the present invention. More specifically, FIG. 10 shows the processes after the transmission of the first data obtainment request from the content obtaining apparatus 400 to the content relaying apparatus 300. This first data obtainment request is a message for obtaining the content data (hereinafter referred to as "the target content data") selected by the user of the content obtaining apparatus 400 from among the content data items shown by the index data 305a.

In FIG. 10, the users of the content providing apparatus 100, the content obtaining apparatus 400, the content providing apparatus 500, and the content obtaining apparatus 600 shown in FIG. 1 are assumed to be User A "Mike", User C "Julia", User B "Alice", and User D "Tom", respectively.

First, the provision and relay determining unit 306 receives the first data obtainment request via the communication unit 301 (S601). The provision and relay determining unit 306 extracts, from the received first data obtainment request, user information indicating the user of the content obtaining apparatus 400 that is the transmission source (hereinafter, the user is referred to as "the obtainment-requesting user") and the user of the content providing apparatus 100 that is capable of providing the target content data (hereinafter, the user is referred to as "the providing user"). Next, the social information managing unit 302 obtains the familiarity degree between the obtainment-requesting user (User C "Julia" here) and the providing user (User A "Mike" here), with reference to the social information 303a (S602).

Next, the provision and relay determining unit 306 determines whether or not the obtainment-requesting user and the providing user know each other by determining whether or not the obtained familiarity degree is "0" (S603). Here, when the obtainment-requesting user and the providing user do not know each other (the familiarity degree is not "0" (N in S603), the provision and relay determining unit 306 transmits a message indicating that no connection can be established, as a response to the first data obtainment request (S610).

On the other hand, when the obtainment-requesting user and the providing user know each other (the familiarity degree is "0" (Y in S603), the provision and relay determining unit 306 determines whether or not the priority level of the obtainment-requesting user with respect to the providing user is larger than or equal to a predetermined value, based on the obtained familiarity degree (S605). Here, the predetermined value is "Level B" shown in FIG. 8. In other words, the provision and relay determining unit 306 determines whether or not the numerical value indicating the familiarity degree is larger than or equal to "0.50".

Here, when the priority level of the obtainment-requesting user is smaller than the predetermined value (N in S605), a message indicating that no connection can be established is transmitted as a response to the first data obtainment request (S606). On the other hand, when the priority level of the obtainment-requesting user is larger than or equal to the predetermined value (Y in S605), the provision and relay determining unit 306 transmits the apparatus-unique connection information for establishing network connection with the content providing apparatus 100, as a response to the first data obtainment request (S607).

For example, as shown in FIG. 6B and FIG. 7, the familiarity degree of User C "Julia" with respect to User A "Mike" is "0.83". Accordingly, since the familiarity degree is larger than the predetermined value "0.5", the content obtaining apparatus 400 of User C can obtain the apparatus-unique connection information for establishing a direct connection to the content providing apparatus 100 of User A. The obtainment determining unit 405 of the content obtaining apparatus 400 of User C transmits the second data obtainment request for obtaining the desired content data to the content providing apparatus 100, according to the operation by User C. As a result, the content obtaining apparatus 400 can obtain the desired content data from the content providing apparatus 100. The content obtaining apparatus 400 can store the desired content data in the content data storage unit 407. In other words, the content providing apparatus 100 and the content obtaining apparatus 400 can share the content data.

As described above, according to the content sharing system 10 in this embodiment, whether or not data can be provided is determined based on the familiarity degree between the user who provides the content data and the user who obtains the content data, and the content data is directly communicated between the apparatuses owned by the users. For this reason, for example, it is possible to reduce the size of a storage area for storing content data in a server in a network service for the purpose of sharing content data. The user who provides the content data can reduce the operation cost (such as an operation of uploading the content data). Furthermore, since the content data is directly provided without a server, it is also possible to reduce the communication cost. Furthermore, the content data is provided only to users who are in a close relationship with the provider, it is possible to reduce cases of unauthorized access to and leakage of the content data.

[Variation 1 of Embodiment 1]

Next, Variation 1 of Embodiment 1 is described. In a content sharing system 10 according to this variation, a content providing apparatus 100 transmits content data to a content obtaining apparatus 400 such that transmission of the content data is given a higher priority when the familiarity degree of the user of the content obtaining apparatus 400 is higher. With reference to the drawings, descriptions are given below focusing on the points different from those of Embodiment 1.

Figure 11:
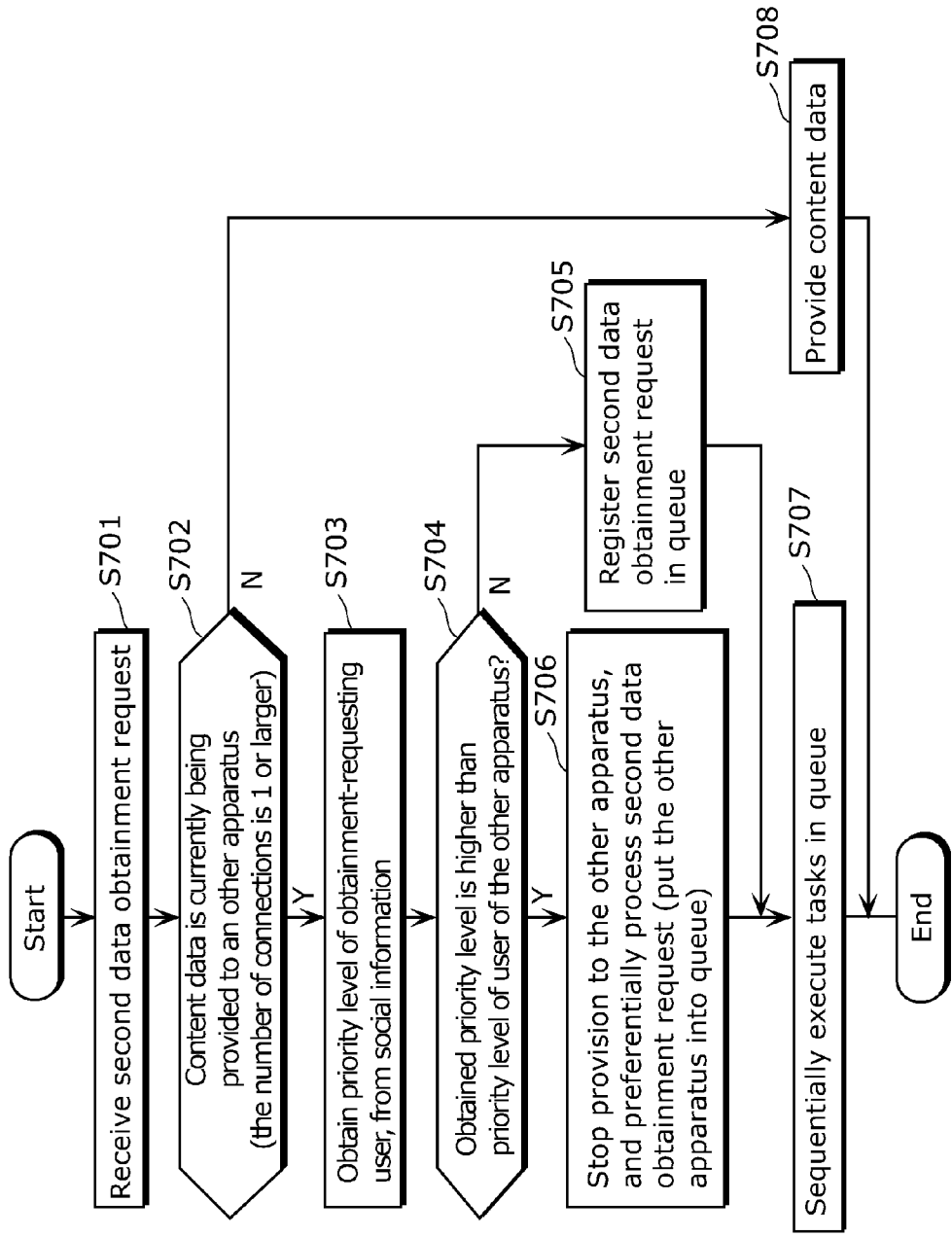
FIG. 11 is a flowchart of external-provision determination processes according to Variation 1 of Embodiment 1 of the present invention.

FIG. 11 is a flowchart of external-provision determination processes according to Variation 1 of Embodiment 1 of the present invention.

As shown in FIG. 11, the external-provision determining unit 107 of the content providing apparatus 100 receives the second data obtainment request including the apparatus-unique connection information, from the obtainment determining unit 405 of the content obtaining apparatus 400

(S701). The external-provision determining unit 107 checks whether or not the content data 105a is currently being provided to a content obtaining apparatus 600 of a user other than the obtainment-requesting user who made the received second data obtainment request (S702). In other words, the external-provision determining unit 107 determines whether or not the number of content obtaining apparatus which are currently being connected is 1 or more (the number corresponding to the number of connections).

Here, when the content data 105a is not currently being provided to the content obtaining apparatus 600 (N in S702), the external-provision determining unit 107 executes the processing corresponding to the received second data obtainment request (S708). In other words, the external-provision determining unit 107 starts to provide the content data 105a to the content obtaining apparatus 400 that is the transmission source of the second data obtainment request.

On the other hand, when the content data 105a is currently being provided to the content obtaining apparatus 600 (Y in S702), the external-provision determining unit 107 obtains, from the content relaying apparatus 300, (i) the familiarity degree between the user (the obtainment-requesting user) of the content obtaining apparatus 400 that is the transmission source of the received second data obtainment request and the user (the providing user) of the content providing apparatus 100 and (ii) the familiarity degree between the user of the content obtaining apparatus 600 and the user of the content providing apparatus (S703).

For example, the external-provision determining unit 107 obtains, from the content relaying apparatus 300, the familiarity degree "0.83" between User C "Julia" of the content obtaining apparatus 400 that is the transmission source of the second data obtaining request and User A "Mike" of the content providing apparatus 100 and the familiarity degree "0.53" between User D "Tom" of the content obtaining apparatus 600 and User A "Mike" of the content providing apparatus 100.

More specifically, the external-provision determining unit 107 extracts user information indicating the obtainment-requesting user from the second data obtainment request. Next, the external-provision determining unit 107 asks the content relaying apparatus 300 about the familiarity degree between the obtainment-requesting user (User C "Julia" here) and the providing user (User A "Mike" here) indicated by the extracted user information. Furthermore, the external-provision determining unit 107 asks the content relaying apparatus 300 about the familiarity degree between the user who is currently receiving the content (User D "Tom" here) and the providing user (User A "Mike" here).

Next, the external-provision determining unit 107 determines whether or not the priority level (that is a familiarity degree) of the user of the content obtaining apparatus 400 that is the transmission source of the second data obtainment request is higher than the priority level of the user of the content obtaining apparatus 600 which is currently receiving the content data. Here, when the priority level of the content obtaining apparatus 400 that is the transmission source of the second data obtainment request is not higher than the priority level of the user of the content obtaining apparatus 600 (N in S704), the external-provision determining unit 107 registers the second data obtainment request in a job queue (S705).

On the other hand, when the priority level of the user of the content obtaining apparatus 400 that is the transmission source of the second data obtainment request is higher than the priority level of the user of the content obtaining apparatus 600 (Y in S704), the external-provision determining unit 107 stops providing the content data to the content obtaining apparatus 600, and performs control for preferentially processing the second data obtainment request (S706). More specifically, the external-provision determining unit 107 modifies the job queue such that the content data provision processing for the content obtaining apparatus 600 is executed after the content data provision processing for the content obtaining apparatus 400 that is the transmission source of the second data obtainment request.

The external-provision determining unit 107 sequentially executes the tasks registered in the job queue (S707). In other words, the external-provision determining unit 107 transmits the content data to the content obtaining apparatus such that transmission of the content data is given a higher priority when the familiarity degree is higher. For example, in the social information table shown in FIG. 6B, the familiarity degree of User C "Julia" with respect to User A "Mike" is "0.83", and the familiarity degree of User D "Tom" with respect to User A "Mike" is "0.53". Accordingly, the external-provision determining unit 107 stops providing the content data to the content obtaining apparatus 600 of User D "Tom" that is currently receiving the content data, and preferentially provides the content data to the content obtaining apparatus 400 of User C "Julia" connected after User D "Tom".

Here, when the familiarity degree of User C is higher than the familiarity degree of User D, the external-provision determining unit 107 stops providing the content data to the content obtaining apparatus 600 of User D. However, priority control does not always need to be performed in such a manner. For example, the content providing apparatus 100 may transmit the content data to the content obtaining apparatus such that transmission of the content data is given a higher priority when the familiarity degree is higher, by modifying assignment of a communication bandwidth depending on the familiarity degree.

As described above, according to the content sharing system 10 in this variation, in the case of reception of a plurality of second data obtainment requests for requesting obtainment of at least one content data item, a higher priority is placed on provision of the content data to an obtainment-requesting user having a higher familiarity degree with the providing user. For this reason, it is possible to preferentially provide content data of a high grade or a high image quality to a user having a higher familiarity degree, and to provide content data of a low grade or a low image quality to a user having a lower familiarity degree. Alternatively, it is possible to put provision of content data to a user having a comparatively low familiarity degree in a queue. In other words, according to the content sharing apparatus 10, it is possible to control provision priority appropriately, and thus to reduce the communication cost and the processing load of the content providing apparatus 100.

In addition, when the content providing apparatus 100 replace the content data by apparatus's resources and functions that can be provided to the outside (the resources and functions are, for example, a storage area for the content data 105a that is provided by the data storage unit 104, a content data transform function by the application unit 103, and a function for receiving content data such as broadcast contents), it is possible to determine whether or not the resources and functions can be provided, based on the familiarity degree between the user of the content providing apparatus 100 and the user who request obtainment and use of the apparatus's resources and functions. When the resources and functions can be provided, it is possible to provide the resources and functions of the content providing apparatus 100 to the apparatus owned by the user who requests the obtainment and use. Accordingly, for example, it is possible to use the content data storage unit of the content providing apparatus 100, as a backup area of the content data of the content obtaining apparatus 400 of the user having a high familiarity degree. In addition, the content obtaining apparatus 400 can cause the content providing apparatus 100 owned by the user having the high familiarity degree to execute a conversion processing on the content data or a proxy recording of the desired content data. In other words, it is possible to perform control such that the resources and functions of the content providing apparatus 100 owned by the user are provided to only such a user having a high familiarity degree.

[Variation 2 of Embodiment 1]

Next, Variation 2 of Embodiment 1 is described. In the content sharing system 10 according to this variation, the content relaying apparatus 300 transmits, to the content obtaining apparatus 400, connection information for enabling the content relaying apparatus 300 to establish network connection with the content providing apparatus 100, based on state information indicating a state of the content providing apparatus 100. With reference to the drawings, descriptions are given below focusing on the points different from those of Embodiment 1.

Figure 12:
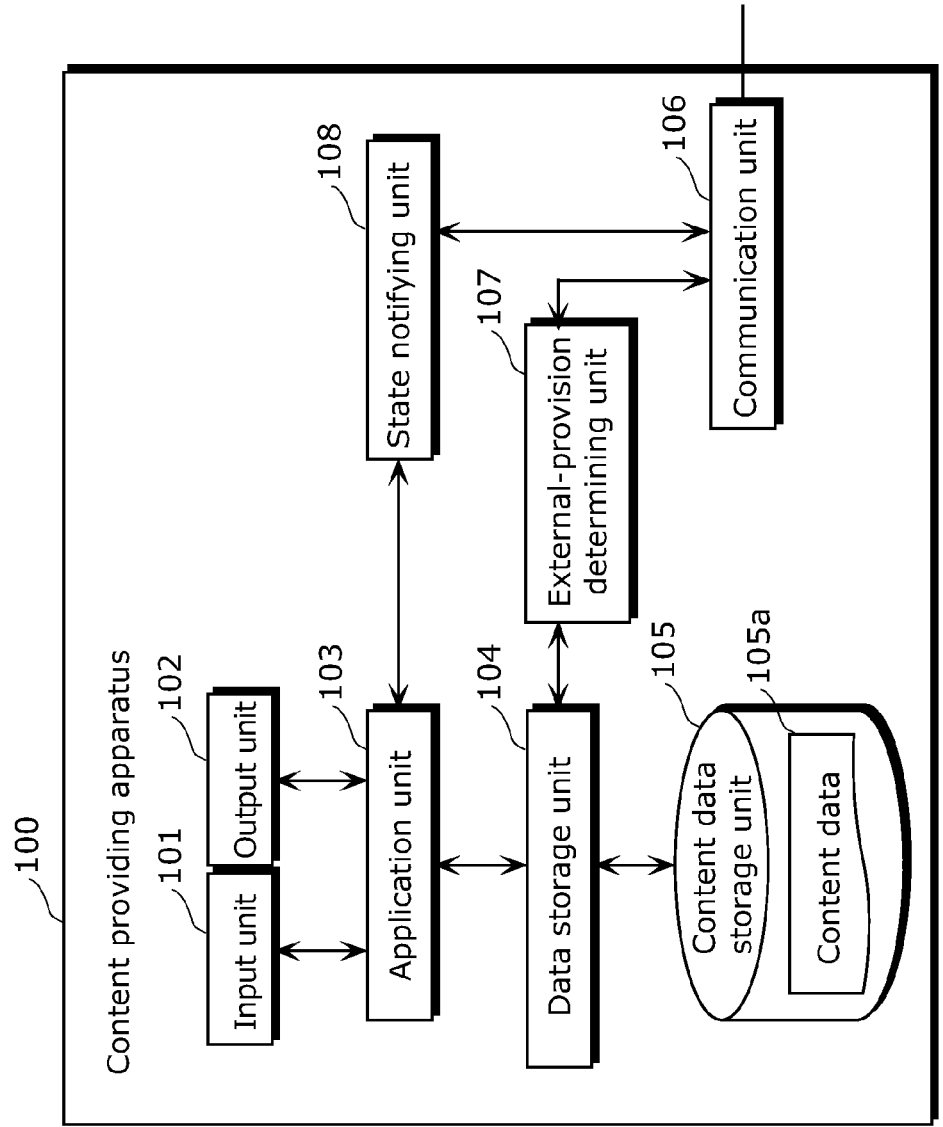
FIG. 12 is a block diagram of a functional structure of a content providing apparatus according to Variation 2 of Embodiment 1 of the present invention.
Figure 13:
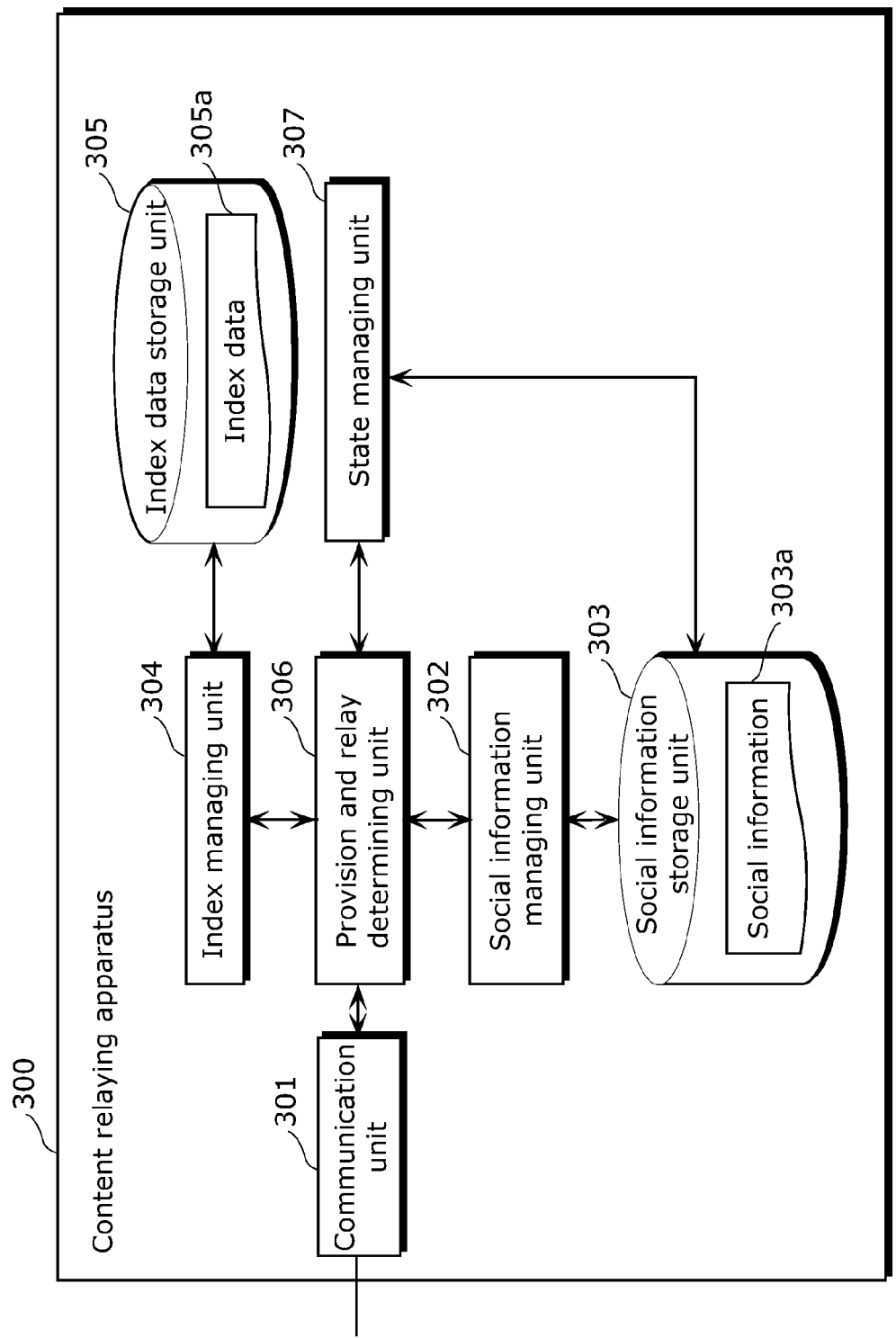
FIG. 13 is a block diagram of a functional structure of a content relaying apparatus according to Variation 2 of Embodiment 1 of the present invention.

FIG. 12 is a block diagram of a functional structure of a content providing apparatus 100 according to Variation 2 of Embodiment 1 of the present invention. FIG. 13 is a block diagram of a functional structure of a content relaying apparatus 300 according to Variation 2 of Embodiment 1 of the present invention. In FIG. 12 and FIG. 13, the same structural elements as in FIG. 2 and FIG. 3 are assigned with the same numerical references, and descriptions thereof are skipped appropriately.

As shown in FIG. 12, the content providing apparatus 100 includes a state notifying unit 108, in addition to the structural element shown in FIG. 2. The state notifying unit 108 transmits the state information indicating the state of the content providing apparatus 100 to the content relaying apparatus 300. More specifically, the state notifying unit 108 transmits the state information to the content relaying apparatus 300 via a network 200 and a communication unit 106. The state information shows a communication state of the content providing apparatus 100.

Furthermore, as shown in FIG. 13, the content relaying apparatus 300 includes a state managing unit 307, in addition to the structural elements shown in FIG. 3. The state managing unit 307 manages the state information transmitted from the content providing apparatus 100. More specifically, the state managing unit 307 stores the state information in the social information storage unit 303.

FIG. 14 is a diagram of an exemplary user information table in Variation 2 of Embodiment 1 of the present invention. In FIG. 14, the aforementioned state information is stored, in addition to the various kinds of information stored in the user information table shown in FIG. 6A. Here, the state information shows whether or not each of the apparatuses of the users is in an OFF-line state in which the apparatus of the user cannot communicate with the apparatuses via the network 200. Furthermore, the state information shows the number of connections with one or more apparatuses, when a current apparatus is in an ON-line state in which the apparatus can communicate with the apparatuses via the network 200.

The user information table in FIG. 14 shows, for example, that the apparatus of User A "Mike", the apparatus of User E "Paul", and the apparatus of User F "James" are in an OFF-line state. In addition, the user information table shows, for example, that the apparatus of User B "Alice" is in ON-line, and the number of connections is "1".

The provision and relay determining unit 306 of the content relaying apparatus 300 determines whether or not the content providing apparatus 100 is currently ON-line, with reference to the user information table storing the state information. Here, when the content providing apparatus 100 is not ON-line, a message indicating that no apparatus-unique connection information is transmitted or the content providing apparatus 100 is OFF-line is transmitted as a response to the first data obtainment request. In other words, the provision and relay determining unit 306 transmits the connection information for enabling the content obtaining apparatus 400 to establish network connection with the content providing apparatus 100 to the content obtaining apparatus 400, only when the content providing apparatus 100 in ON-line. In other words, the provision and relay determining unit 306 transmits, to the content obtaining apparatus 400, the connection information for the connection to the content providing apparatus 100, based on the state information received from the content providing apparatus 100. In this way, the content obtaining apparatus 400 can avoid failing to establish network connection to the content providing apparatus in OFF-line.

As described above, according to the content sharing system 10 in this variation, the priority order of the content providing apparatus that should be connected is determined according to state information of the content providing apparatus that is a candidate connection destination. Accordingly, the content sharing system 10 achieves the following exemplary objects: to temporarily exclude a content providing apparatus that is currently OFF-line (and is thus unable to provide any content) from candidates; to lower a priority order when the quality of the content to be provided cannot be assured because the current owner is using the apparatus; to urge a next waiting user to make an obtainment request for obtaining the content data when completion of provision of the content data is confirmed (these exemplary objects are related to problems that are unique to apparatuses owned by personal users and do not arise in relation to content providing apparatuses such as load balancing servers which can be controlled by system managers).

In other words, when the state of the content providing apparatus 100 is a state undesirable for provision of the content data, it is possible to disable transmission of the connection information for connection to the content providing apparatus 100. Accordingly, it is possible to reduce the number of cases where the content obtaining apparatus 400 fails to obtain the content data from the content providing apparatus 100.

[Variation 3 of Embodiment 1]

Next, Variation 3 of Embodiment 1 is described. In the content sharing system 10 according to this variation, the content providing apparatus 100 modifies content data that can be provided, to generate modified content data having a data amount smaller than the data amount of the original content data. With reference to the drawings, descriptions are given below focusing on the points different from those of Embodiment 1.

Figure 15:
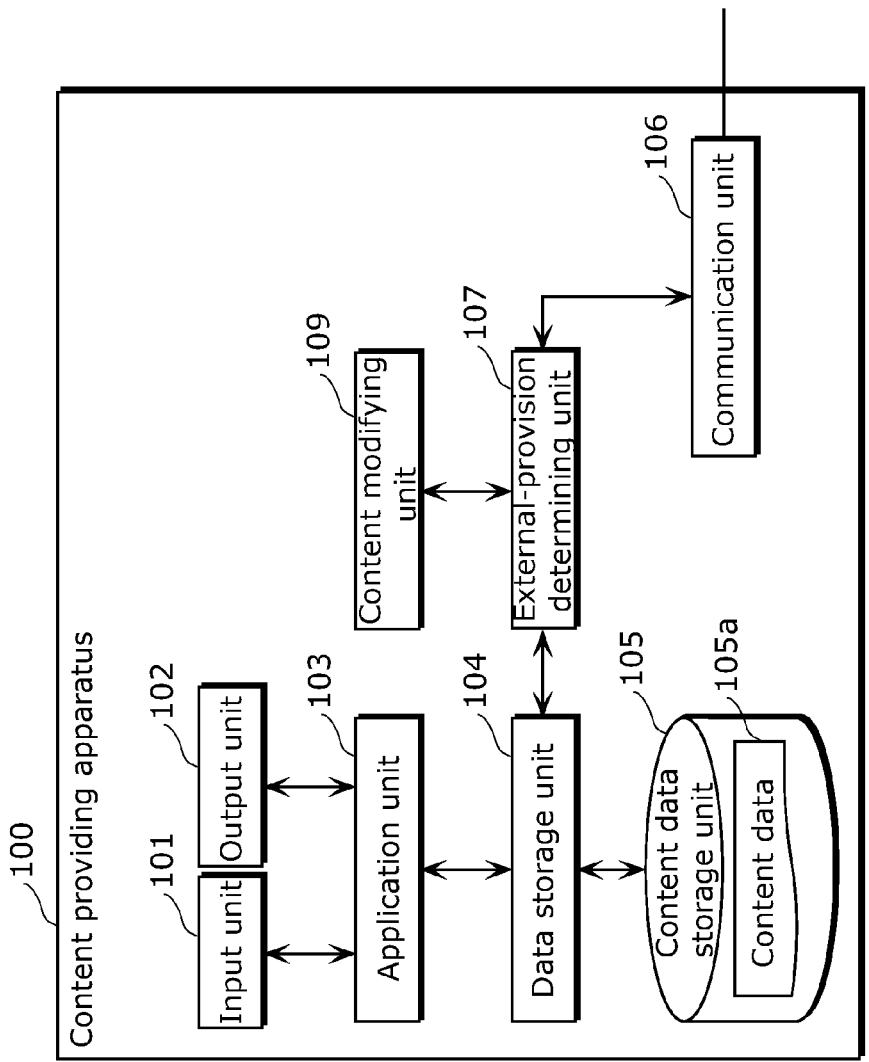
FIG. 15 is a block diagram of a functional structure of a content providing apparatus according to Variation 3 of Embodiment 1 of the present invention.
Figure 16:
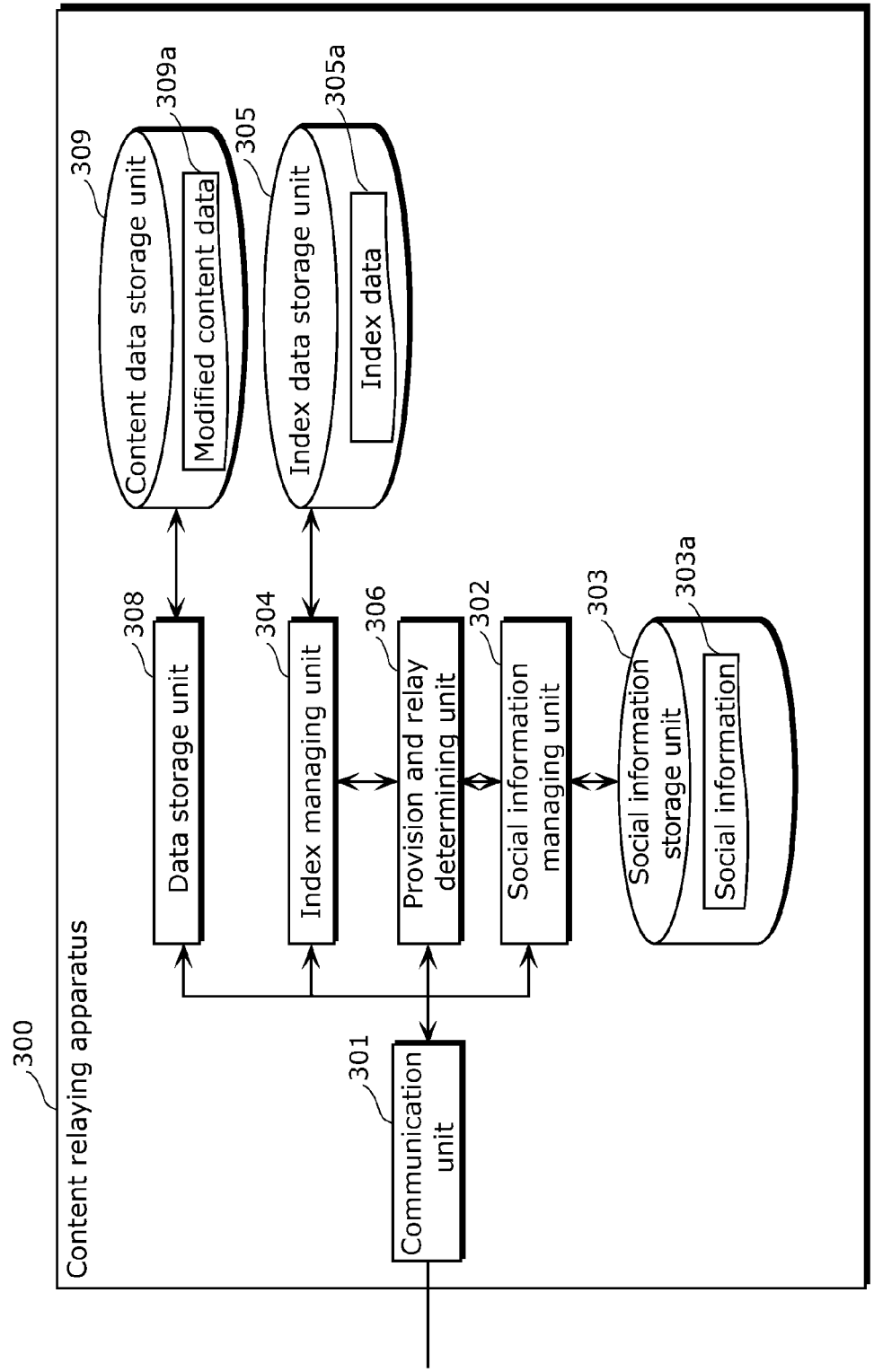
FIG. 16 is a block diagram of a functional structure of a content relaying apparatus according to Variation 3 of Embodiment 1 of the present invention.

FIG. 15 is a block diagram of a functional structure of a content providing apparatus 100 according to Variation 3 of Embodiment 1 of the present invention. FIG. 16 is a block diagram of a functional structure of a content relaying apparatus 300 according to Variation 3 of Embodiment 1 of the present invention. In FIG. 15 and FIG. 16, the same structural elements as in FIG. 2 and FIG. 3 are assigned with the same numerical references, and descriptions thereof are skipped appropriately.

As shown in FIG. 15, the content providing apparatus 100 includes a content modifying unit 109, in addition to the structural element shown in FIG. 2. The content modifying unit 109 modifies the content data to generate the modified content data having the data amount smaller than the data amount of the content data. The modified content data is, for example, a digest version of the original content data. More specifically, assuming that the content data is video data, the modified content data is, for example, data corresponding to a predetermined time period (for example, first one minute) in the video data.

In addition, as shown in FIG. 16, the content relaying apparatus 300 includes a data storage unit 308 and a content data storage unit 309, in addition to the structural elements shown in FIG. 3. The data storage unit 308 stores, into the content data storage unit 309, modified content data 309a modified by the content modifying unit 109.

The content data storage unit 309 is, for example, a hard disk or a flash memory. The content data storage unit 309 stores the modified content data 309a in a re-readable format.

FIG. 17 is a diagram showing exemplary index data 305a in Variation 3 of Embodiment 1 of the present invention. The index data 305a shown in FIG. 17 includes the reproduction times and the reproduction paths of the modified content data items, in addition to the index data shown in FIG. 5.

Here, the external-provision determining unit 107 of the content providing apparatus 100 obtains an available capacity in the content data storage unit 309 for storing the modified content data 309a from the content relaying apparatus 300 via a network 200 and a communication unit 106.

The content modifying unit 109 generates the modified content data by modifying the content data 105a such that the data amount of the modified content data is changed depending on the obtained available capacity. More specifically, the content modifying unit 109 modifies the content data such that the ratio of the area required to store the modified content data with respect to the available capacity in the content data storage unit 309 of the content relaying apparatus 300 does not reach or exceed a predetermined value (for example, by extracting, as the digest version, only the video corresponding to the first one minute, until the available capacity reaches to the half of the full storage capacity). In other words, the content modifying unit 109 generates the modified content data such that the data amount of the modified content data is smaller when the obtained available capacity is smaller.

In this embodiment, the content modifying unit 109 generates the modified content data as the digest version having one-minute reproduction time, by modifying the content data items 105a ("C-1" to "C-10" which are video contents having mutually different total reproduction times. The external-provision determining unit 107 transmits, to the content relaying apparatus 300, the generated modified content data and information related to the modified content data (the reproduction times and the reproduction paths here).

The provision and relay determining unit 306 of the content relaying apparatus 300 stores the modified content data 309a in the content data storage unit 309 via the content storage unit 308. Next, the provision and relay determining unit 306 transmits the modified content data 309a to the content obtaining apparatus 400.

The output unit 402 of the content obtaining apparatus 400 outputs the modified content data 309a onto a display screen, for example, together with the index data. Next, the input unit 401 receives, from the user, an obtainment instruction for obtaining the content data corresponding to the modified content data 309a output on the display screen. The obtainment determining unit 405 transmits the first data obtainment request to the content relaying apparatus 300, according to the received obtainment instruction.

As described above, according to the content sharing system 10 in this variation, it is possible to modify the content data to generate modified content data having the data amount smaller than the content data. For this reason, the content relaying apparatus 300 can reduce memory capacity for data storage more significantly than in the case of storing the raw content data. In addition, for example, an other user can check the details of the content data by viewing the modified content data. Accordingly, the user can understand the details of the contents more easily than in the case of selecting a desired content by text. As a result, it is possible to reduce the number of cases where the user selects different content data.

In addition, it is possible to automatically generate the modified content data according to the available capacity of the content data storage unit 309. For this reason, it is possible to reduce the time required for such upload and to reduce the communication cost more significantly than in the case of uploading the whole content. Furthermore, since there is no need to prepare a storage capacity for storing the whole content data, it is possible to reduce the size of the storage area for storing the content data.

In this variation, the content modifying unit 109 generates the modified content data according to the available capacity in the content data storage unit 309 in the content relaying apparatus 300. However, the modified content data does not always need to be generated in this way. For example, the content modifying unit 109 may obtain the familiarity degree of the other user with respect to the user of the content providing apparatus 100, from the content relaying apparatus 300, and generate modified content data, based on the obtained familiarity degree. In this way, it is possible to generate the modified content data adapted to the user having a high familiarity degree. Accordingly, the user having the high familiarity degree who is highly likely to request obtainment of the content data can easily check the details of the content data. As a result, it is possible to reduce the number of cases where different content data is selected.

More specifically, the content modifying unit 109 may modify the content data that is video data including a plurality of pictures such that video data of the resulting modified content data includes a greater number of pictures in each of which an image of the other user is included when the familiarity degree of the other user is higher. With this structure, the user who is highly likely to request obtainment of the content data can check the details of the content data more easily. As a result, it is possible to reduce the number of cases where different content data is selected.

In this case, for example, the content data may be preferably assigned with a tag for identifying the user in each of sequential picture groups. In this way, the content modifying unit 109 can modify the content data in a relatively easy manner such that video data of the resulting modified content data includes a greater number of pictures in each of which an image of the other user is included when the familiarity degree of the other user is higher.

In this way, when there are users having a high familiarity degree, the content modifying unit 109 may generate, in advance, at least one modified content data applicable for the other user's profile that is referred to by the content relaying apparatus 300. In this way, the content providing apparatus 100 can provide the modified content data suitable for tastes of each user. For this reason, for example, the other user can: understand only the essence of content data (e.g. a digest of a content related to vigorous activity of a grandchild); understand the outline (e.g. the atmosphere in the whole wedding ceremony, the outline of a travel); understand time-series changes of compound elements from the viewpoint of the user him/herself (e.g. a record of growth of a cousin after the last meeting, a travel journal of a friend; or understand a content based on a representation effect adapted to a taste of the user (e.g. a favorite template such as a news-like template, display using large characters and facial expressions, a slide show with a low picture switching speed). As a result, the other user can understand the details of the content data more easily and precisely. In other words, the content sharing system 10 can reduce the time and operation cost required for browsing and viewing by the user.

In addition, the content modifying unit 109 may form group information considering the relationships between other users, in addition to considering the familiarity degree of the other user, and generate, in advance, the at least one modified content data based on the information related to the content data and the group information. In this way, the user can manage the at least one modified content data and control the browsing of the content data on per group information basis. For this reason, for example, the content modifying unit 109 can generate, in advance, first modified content data for users such as family members and relatives, second modified content data for users such as close friends, and third modified content data for users such as other friends and acquaintances (such as a superior at the user's workplace, a colleague, a mate in a club activity).

In this case, the first modified content data may include private content such as images of grandchild's facial expressions and inside of the home. In addition, the second modified content data may include content data items generated in events such as a home party and a travel and should be shared. In addition, the third modified content data may mainly include contents which are related to events and do not include any private contents such as pictures of family members and close friends and thus can be made public. As a result, in response to a browsing request from each user, the content sharing system 10 can provide modified content data suitable for the group information of the group including the user, from among the plural modified content data items generated in advance in this way.

In this variation, the content providing apparatus 100 includes the content modifying unit 109. However, the content relaying apparatus 300 may include the content modifying unit 109. For example, the external-provision determining unit 107 of the content providing apparatus 100 transmits content data and information related to the content data to the content modifying unit 109 (not shown) of the content relaying apparatus 300 (the information is, for example, position information of an image capturing place, or meta information such as the name of a person in a photograph or a video). The content modifying unit 109 of the content relaying apparatus 300 generates, in advance, at least one modified content data, based on the received content data, the information related to the content data, and the familiarity degree of the other user with respect to the user. In addition, the provision and relay determining unit 306 may control a reference destination of the modified content data. In this way, it is possible to reduce the load of the modification processing in the content providing apparatus 100 having a low processing performance, and further to reduce the load of the processing of generating such modified content data according to each request from a corresponding one of the users who wish to browse the modified content data.

[Variation 4 of Embodiment 1]

Next, Variation 4 of Embodiment 1 is described.

In the content sharing system 10 according to this variation, the content providing apparatus 100 controls priority in the processing of transmitting the content data 105a, according to provision history of the content data 105a. Hereinafter, with reference to the drawings, descriptions are given below focusing on the points different from those of Embodiment 1.

Figure 18:
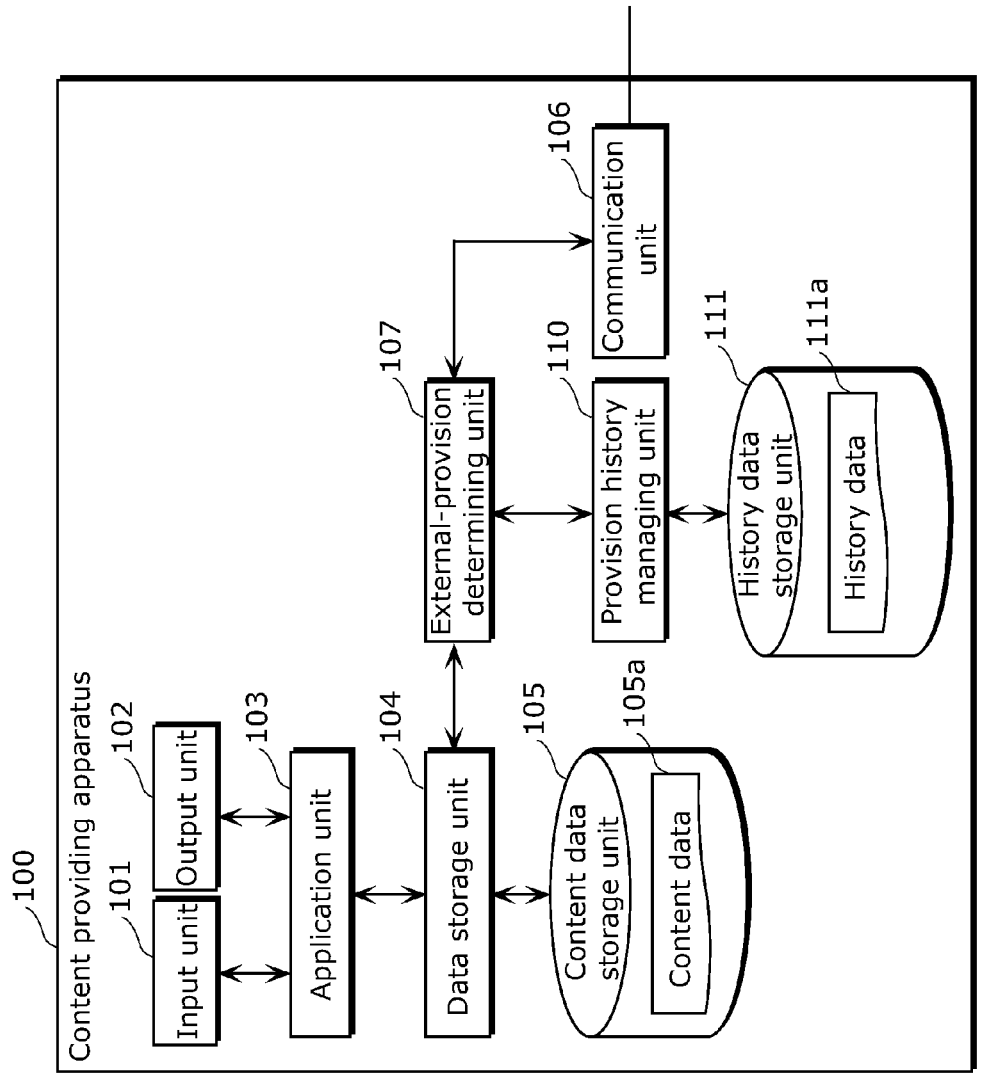
FIG. 18 is a block diagram of a functional structure of a content providing apparatus according to Variation 4 of Embodiment 1 of the present invention.

FIG. 18 is a block diagram of a functional structure of the content providing apparatus 100 according to Variation 4 of Embodiment 1 of the present invention. In FIG. 18, the same structural elements as in FIG. 2 are assigned with the same numerical references, and descriptions thereof are skipped appropriately.

As shown in FIG. 18, the content providing apparatus 100 includes a provision history managing unit 110 and a history data storage unit 111, in addition to the structural elements shown in FIG. 2. The content providing apparatus 100 manages history data 111a. The history data 111a shows content data that the content providing apparatus 100 has previously provided to the content obtaining apparatus 400. More specifically, the provision history managing unit 110 stores, as history data 111a, an identifier of the content obtaining apparatus 400 and an identifier of the content data 105a into the history data storage unit 111, when the content data 105a is provided from the content proving apparatus 100 to the content obtaining apparatus 400.

The history data storage unit 111 is, for example, a hard disk or a flash memory. The history data storage unit 111 stores the history data 111a in a re-readable format.

Here, with reference to the history data 111a, the external-provision determining unit 107 determines whether or not the content data 105a requested by the second data obtainment request has been previously provided to the content obtaining apparatus 400, when the second data obtainment request is received from the content obtaining apparatus 400.

When determining that the content data 105a has never been provided to the content obtaining apparatus 400, the external-provision determining unit 107 prioritizes transmission of the content data 105a than when determining that the content data 105a has been previously provided to the content obtaining apparatus 400. For example, the external-provision determining unit 107 lowers the priority of the transmission of the content data 105a, when the content data 105a requested by the second data obtainment request has been previously provided to the content obtaining apparatus 400.

As described above, with the content sharing system 10 according to this variation, it is possible to determine the provision priority, according to the provision history information regarding the content obtaining apparatus which requests obtainment of the content data. For this reason, for example, it is possible to create appropriate schemes for proper provision according to the provision history. Examples of such schemes include lowering the priority of re-obtainment of the same content by the same user, and lowering the priority when provision of the content data to the same user satisfies a given condition (such as a threshold value for the total obtainment times of the content data in the same day) even if the familiarity degree is high.

[Embodiment 2]

Next, Embodiment 2 of the present invention is described.

A content sharing system 10 according to this embodiment changes a price charged to a user of the content providing apparatus 100, according to history that the content providing apparatus 100 transmitted content data to a content obtaining apparatus 400 according to connection information. Hereinafter, with reference to the drawings, descriptions are given below focusing on the points different from those of Embodiment 1.

The content relaying apparatus 300 in this embodiment is, for example, a distribution service server which performs broadcasting (VOD broadcasting) of a video-on-demand type. The content relaying apparatus 300 charges the user on a per broadcast program basis, according to pay-per-view format (PPV). Accordingly, the content relaying apparatus 300 includes a content data storage unit 309 in which content data 309b is stored. The provision and relay determining unit 306 distributes the content data 309b stored in the content data storage unit 309 to the content providing apparatus 100.

In addition, the content providing apparatus 100 also serves as, for example, a content obtaining apparatus 400. For example, the content providing apparatus 100 is a set top box (STB) capable of secondary providing content data (video of a program according to a PPV format) obtained from the content relaying apparatus 300 to the content obtaining apparatus 400 under control of the content relaying apparatus 300.

Figure 19:
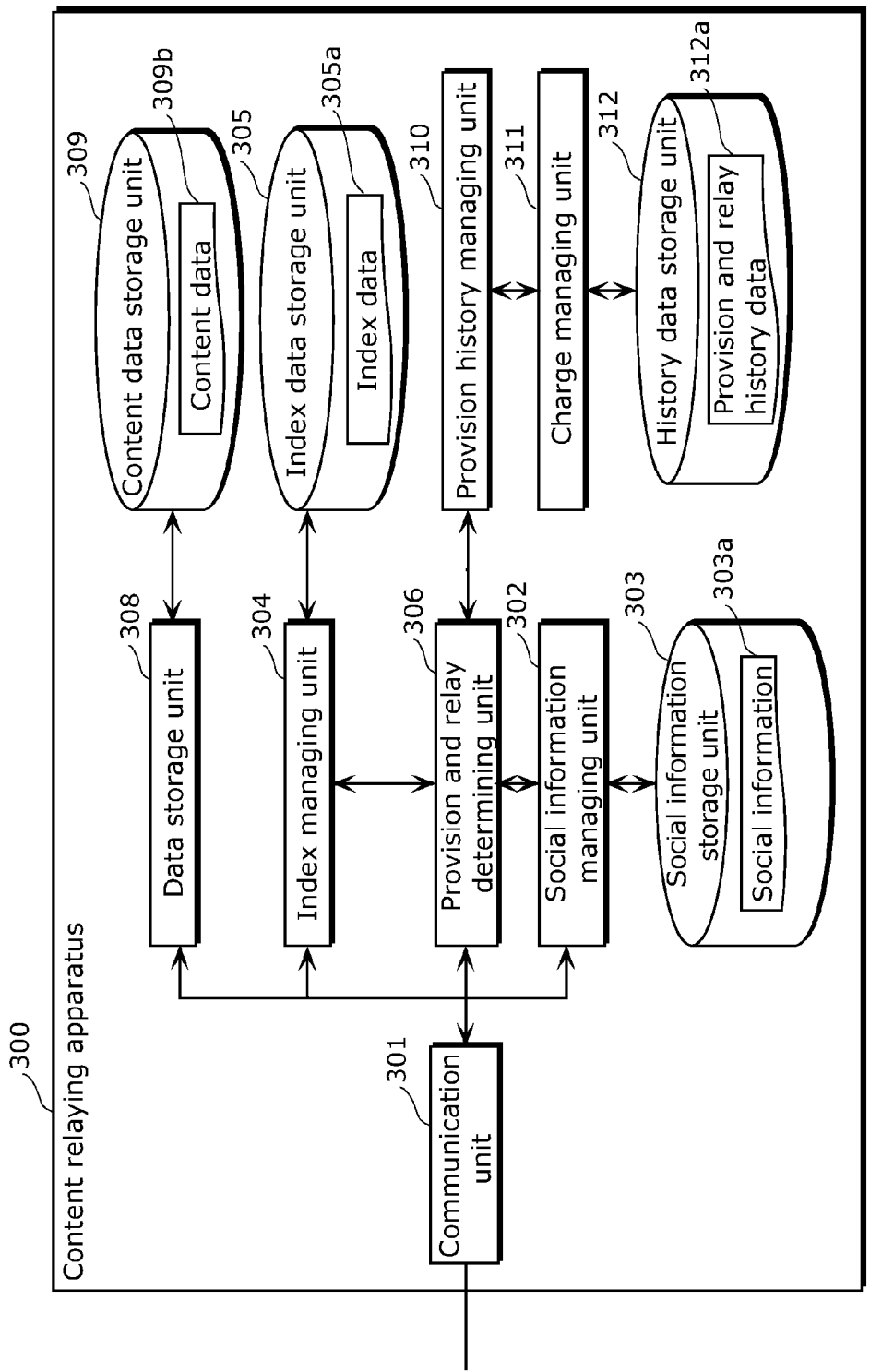
FIG. 19 is a block diagram of a functional structure of a content relaying apparatus according to Embodiment 2 of the present invention.

FIG. 19 is a block diagram of a functional structure of a content relaying apparatus 300 according to Embodiment 2 of the present invention. In FIG. 19, the same structural elements as in FIG. 3 are assigned with the same numerical references, and descriptions thereof are skipped appropriately.

As shown in FIG. 19, the content relaying apparatus 300 includes a data storage unit 308, a content data storage unit 309, a provision history managing unit 310, a charge managing unit 311, and a history data storage unit 312, in addition to the structural elements shown in FIG. 3.

FIG. 20 is a diagram showing exemplary provision and relay history data 312a in Embodiment 2 of the present invention. In addition, FIG. 21 is a diagram showing an exemplary charge change table in Embodiment 2 of the present invention.

Hereinafter, a flow of processing of changing a charge based on provision and relay history is described with reference to FIG. 19 to FIG. 21.

The provision history managing unit 310 of the content relaying apparatus 300 stores history of the content data distributed to the content providing apparatus 100 into the history data storage unit 312 as provision and relay history data 312a together with attribute information of the distributed content data and user information. Furthermore, when the first data obtainment request is received from the content obtaining apparatus 400, the provision and relay determining unit 306 determines whether or not there is a user who is the user of the content providing apparatus 100 which can be provided with the content data requested by the first data obtainment request and who has a familiarity degree larger than or equal to a threshold value with respect to the user of the content obtaining apparatus 400.

Here, when there is such a user, the content relaying apparatus 300 transmits, to the content obtaining apparatus 400, apparatus-unique connection information for establishing network connection with the content providing apparatus 100 capable of providing the content data, instead of distributing the content data 309b stored in the content data storage unit 309 to the content obtaining apparatus 400. In other words, the content relaying apparatus 300 instructs the obtainment-requesting user to facilitate content distribution between users.

Here is an exemplary case where User C "Julia" and User D "Tom" request obtainment of the content data 105a previously distributed from the content relaying apparatus 300 to the content providing apparatus 100 of User A "Mike". In this case, the content obtaining apparatuses 400 of User C "Julia" and User D "Tom" can obtain the content data 105a from the content providing apparatus 100 owned by User A "Mike".

At this time, the provision history managing unit 310 of the content relaying apparatus 300 creates, for example as the provision and relay history data 312a shown in FIG. 20, a list of items of the content data 105a that can by provided by the content providing apparatus 100 (STB-X) owned by User A to the content obtaining apparatus 400 via a network 200. In addition, the provision history managing unit 310 updates the list indicating data names of the items (here, "PPV-1" to "PPV-10") of the content data 105a, charge types (here, "DL-1" to "DL-3"), total reproduction times of the respective content data items, the purchase price for User A, user names to which any one of the items of the content data 105a has previously provided from the content providing apparatus 100 (STB-X) owned by User A. Here, as shown in FIG. 21, the charge managing unit 311 holds the charge change table indicating charge calculation methods determined one by one for the charge types. The charge managing unit 311 performs calculation for discounting a price charged to a content data provider or obtainer according to a corresponding one of the charge calculation methods indicated in this charge change table, and stores the result of the calculation in the provision and relay history data 312a. In other words, a content sharing system 311 changes the price charged to the user of the content providing apparatus 100, according to the history that the content providing apparatus 100 transmitted the content data to the content obtaining apparatus 400 according to the connection information.

For example, as shown in FIG. 20, the content data item "PPV-1" that User A "Mike" purchased for viewing has a charge type "DL-2". Accordingly, when User A "Mike" provides the content data 105a to an other user, the price before being charged to User A "Mike" who is the provider is changed. As a specific example, when User A "Mike" provides the content data 105a to two users who are User C "Julia" and User D "Tom", the charge price is changed from the regular price 1000 YEN to 800 YEN with a discount of 200 YEN. This discount is an incentive for the reduction in the distribution load of the content relaying apparatus 300.

In addition, since the content data "PPV-1" has the charge type of "DL-2", the charge prices for User D "Tom" and User C "Julia" who are obtainers are also discounted. Here is an example case where User D "Tom" is provided with the content data "PPV-1" from User A "Mike", next to User C "Julia". In this case, User D who is the second obtainer can also purchase the content data "PPV-1" at 800 YEN with a discount for the second user from the regular price 1000 YEN.

As described above, according to the content sharing system 10 in this embodiment, it is possible to change a charge price to an appropriate charge price as necessary according to provision and relay history of content data between users. For this reason, for example, it is possible to apply a discount (such as a 30% discount in the case of provision to three users) according to the number of users to which the content data is provided. In addition, it is also possible to apply a discount price for a user who obtains a target content data from a content providing apparatus. This discount price is obtained by discounting the regular price that is applied when the target content data is obtained directly from the content relaying apparatus by an amount corresponding to reduction in the processing load of the content relaying apparatus (the discount price is, for example, a 10%-discount that is applied in the case of obtainment from a content providing apparatus of a user).

Here, since the content data is a commercial-use content that is a charge target, the content relaying apparatus 300 copies the content data naturally according to Digital Rights Management (DRM) scheme for content control and management. Furthermore, certain processing (streaming transfer, copying, or the like) may be possible on condition that predetermined conditions (for example, the number of times, the number of days, contract conditions for a partner, transformation into data of a specified quality, or the like) are satisfied according to a country's law and an industry standard. For example, when the familiarity degree between given users is larger than or equal to a predetermined threshold value, it is possible to copy content data for free according to a predetermined condition (for example, by changing the remaining permitted number of copying times of a content to 9 if the original permitted number of copying times of the content is 10), and to perform control such that the content is shared among family members and friends who live at distant places.

[Variation of Embodiment 2]

Next, Variation of Embodiment 2 is described.

Figure 22:
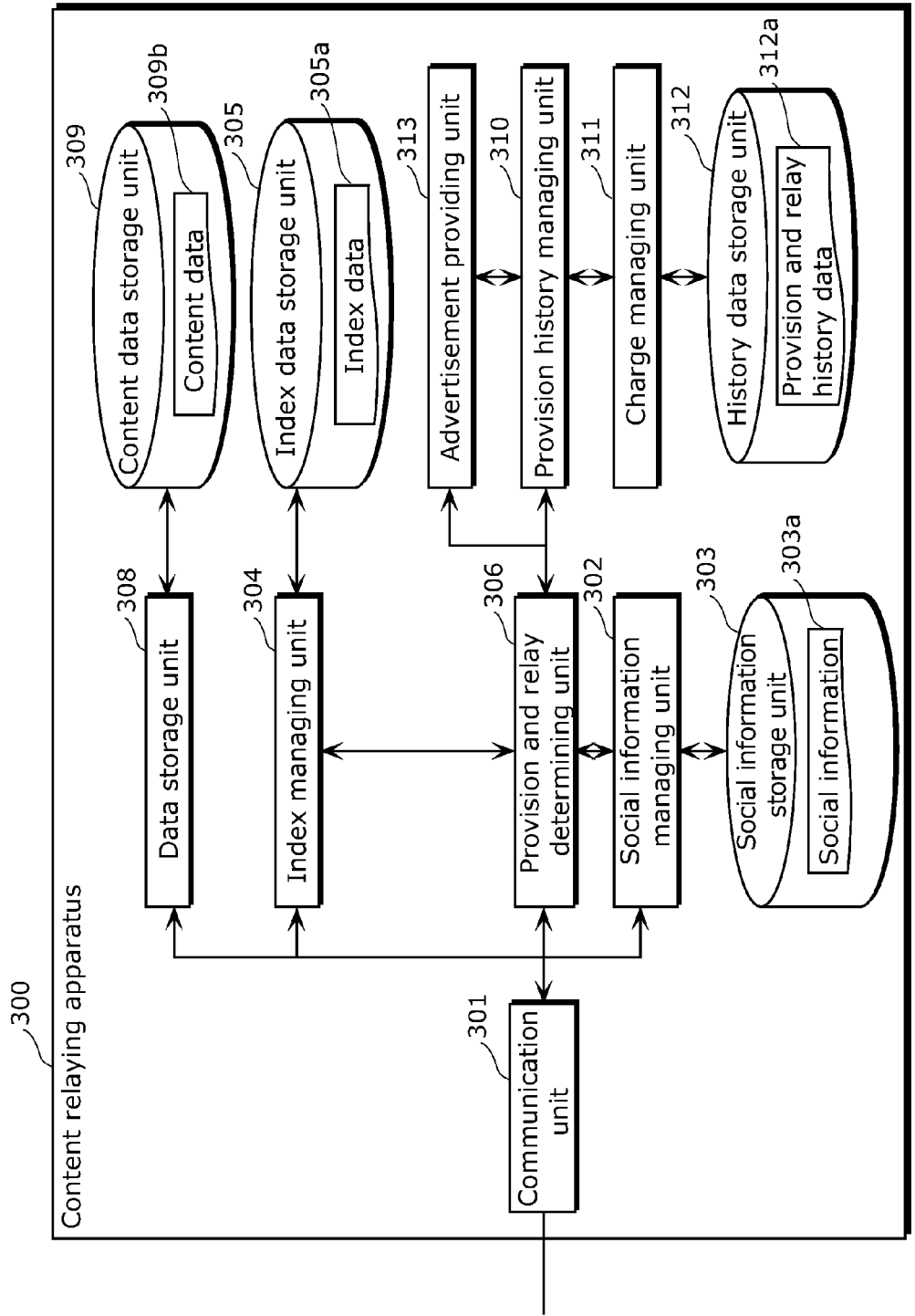
FIG. 22 is a block diagram of a functional structure of a content relaying apparatus according to Variation of Embodiment 2 of the present invention.
Figure 23:
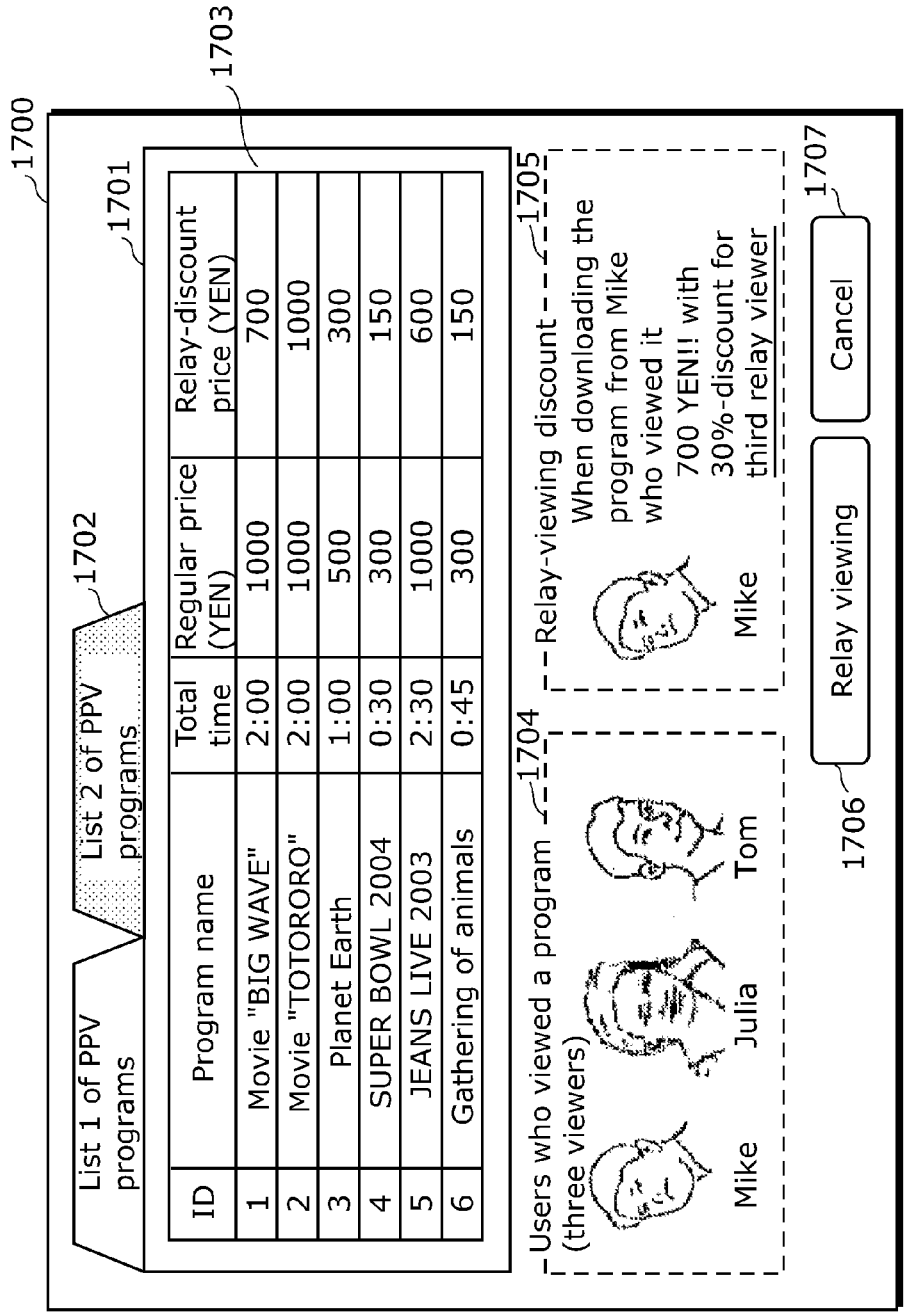
FIG. 23 is a diagram showing an exemplary advertisement display screen in Variation of Embodiment 2 of the present invention.

FIG. 22 is a block diagram of a functional structure of a content relaying apparatus 300 according to Variation of Embodiment 2 of the present invention. FIG. 23 is a diagram showing an exemplary advertisement display screen in Variation of Embodiment 2 of the present invention. In FIG. 22, the same structural elements as in FIG. 3 or FIG. 19 are assigned with the same numerical references, and descriptions thereof are skipped appropriately.

As shown in FIG. 22, the content providing apparatus 100 includes an advertisement providing unit 313, in addition to the structural elements shown in FIG. 19.

When receiving a first data obtainment request from a content obtaining apparatus 400, the provision and relay determining unit 306 of the content relaying apparatus 300 requests the advertisement providing unit 313 to create an advertisement together with user information indicating the user (the obtainment-requesting user) of the content obtaining apparatus 400 that is the transmission source of the first data obtainment request.

The advertisement providing unit 313 obtains the sequential order of the obtainment-requesting user for obtaining the content data from the providing user, with reference to provision and relay history data 312a of the user (providing user) having a familiarity degree larger than or equal to a threshold value with respect to the obtainment-requesting user (here, User E "Paul"). Based on the result of the obtainment, the advertisement providing unit 313 creates a practical or attractive advertisement for the obtainment-requesting user. In other words, the advertisement providing unit 313 creates advertisement data related to content data, based on history that the content providing apparatus 100 transmitted content data to the content obtaining apparatus 400 according to connection information. The advertisement providing unit 313 distributes the created advertisement data to apparatuses on a network 200.

More specifically, for example, when past records of the transfer and distribution of the content data 105a between users satisfy an arbitrary condition, the advertisement providing unit 313 creates an advertisement that reflects the real state in the real world, for example, an advertisement indicating that the content data 105a can be purchased at a price lower than the regular price. The provision and relay determining unit 306 transmits, to the content obtaining apparatus 400, index data of the content data, apparatus-unique connection information (here the connection information to the content providing apparatus 100 owned by User A "Mike") and charge information with a discount to the user of the content obtaining apparatus 400, together with the advertisement created by the advertisement providing unit 313.

The obtainment determining unit 405 of the content obtaining apparatus 400 transfers various kinds of information received from the content relaying apparatus 300 to the application unit 403. The application unit 403 outputs a display screen as shown in FIG. 23 through the output unit 402. This display screen is a display screen that is presented by the content obtaining apparatus owned by User E "Paul" who requested obtainment of the content data.

An area 1701 of the display screen 1700 presents a list of contents of the content data 105a which can be provided by User A "Mike", based on the various kinds of information (some or all of the provision and relay history data shown in FIG. 20) transmitted from the content relaying apparatus 300 to the content obtaining apparatus 400. In addition, when a tab of an area 1702 is selected, a list of contents that are not presented in the area 1701 is presented. Alternatively, it is also possible to present a list of contents of the content data 105a which can be provided by a user other than User A.

An area 1703 shows a state where User E "Paul" selects a desired content data item through the input unit 401. Triggered by this selection instruction, information is presented in an area 1704. The information presented in the area 1704 is information based on the provision and relay history data in FIG. 20, and information of a user having a familiarity degree with respect to User E who has previously purchased and viewed the same program is larger than or equal to a threshold value. Here, the desired content data selected by User E corresponds to the content data "PPV-1" in FIG. 20. In addition, with reference to the provision and relay history of User "Mike" shown in FIG. 20, it is known that the content data has been previously provided to User C "Julia" and User D "Tom". In addition, the social information table shown in FIG. 6B includes settings of familiarity degrees of User A "Mike", User B "Alice", User C "Julia", and User D "Tom" with respect to User E "Paul" who is the owner of the social information.

The advertisement created by the advertisement providing unit 313 is presented in an area 1705, based on the fact that the content data desired by User E "Paul" has been previously provided to User A "Mike", User C "Julia", and User D "Tom". Here, this advertisement shows that User E "Paul" corresponds to "the third viewer" (the obtainer who obtains the content in a relay between users) in "the relay-viewing discount" that is a discount campaign. In addition, this advertisement shows, in an area 1703, that it is possible to purchase the content data at 700 YEN with a discount of 30%, from the regular price 1000 YEN, which is applied when downloading the content data from the content providing apparatus owned by User A "Mike".

User E "Paul" who viewed this advertisement can obtain the content data 105a (here, Movie "BIG WAVE") at a discount price, by pressing a button shown in an area 1706. In addition, User E "Paul" can make an instruction for not obtaining the content data 105a, by pressing a bottom shown in an area 1707.

Here, the provision and relay history data has been described based on the provision and relay history data shown in FIG. 20, but provision and relay history data is not limited thereto. For example, provision and relay history data may include user inputs related to content data items, such as evaluation comments, the degrees of recommendation, the real records of the operation history of the apparatuses of the users (the real records are, for example, time durations from purchasing to viewing of contents, the number of re-viewing times, etc.). In this case, the content relaying apparatus 300 can provide a practical or attractive advertisement for the users of the content obtaining apparatuses by, for example, notifying that a current content is recommended by a user having a high familiarity degree or has been recently viewed by a user having a high familiarity degree so as to motivate the viewer of the advertisement to purchase the current content.

As described above, according to the content sharing system 10 in this variation, it is possible to create an advertisement according to the distribution records and use records of the contents shared and circulated among the users, and to distribute the contents to content obtaining apparatuses. For this reason, for example, it is possible to provide a user who has not yet obtained and viewed a given content with an advertisement that the content is "a content viewed by an acquaintance or a friend". Furthermore, it is possible to activate the content sharing system by utilizing the familiarity degrees in the social information, more specifically, by increasing a discount rate between users having a high familiarity degree with respect to each other (this discount is, for example, 30% for the third user in the case of applying a discount corresponding to the number of friends who relays a content in a relay discount viewing).

In other words, according to the content sharing system 10, it is possible to distribute, to devices on a network, advertisement data generated based on the history that the content providing apparatus transmitted the content data to the content obtaining apparatus. Accordingly, it is possible to distribute the advertisement data on which the after-change charge price is already reflected, and to thereby increase the userfriendliness.

In Embodiment 2, a distribution service for a general broadcasting of a video-on-demand type (VOD broadcasting) is described as an example. However, distribution targets are not limited to video contents. Hereinafter, a case where distribution targets are not video contents is described with reference to FIG. 24 and FIG. 25.

Figure 24:
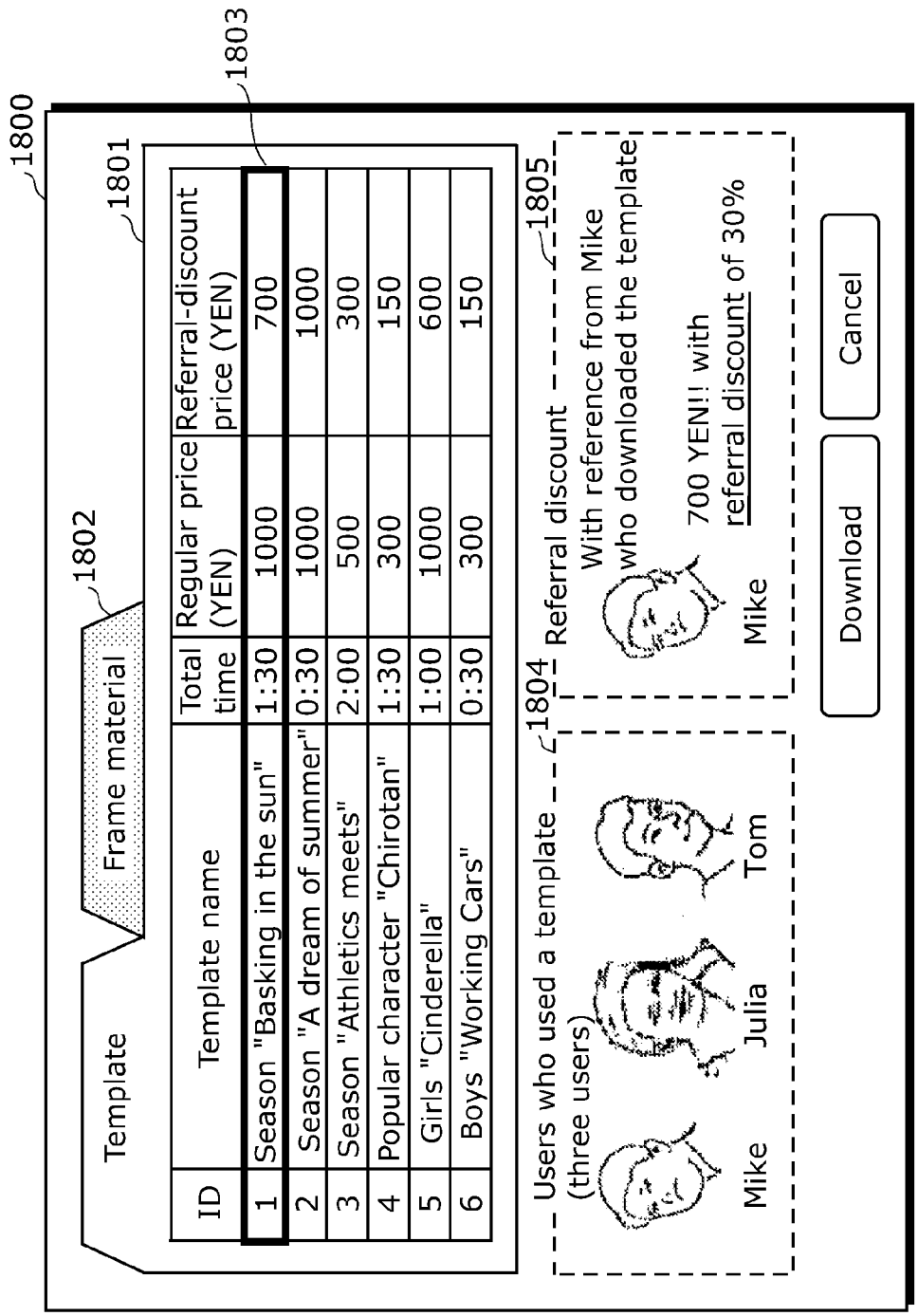
FIG. 24 is a diagram showing an exemplary advertisement display screen in Variation of Embodiment 2 of the present invention.

FIG. 24 is a diagram showing an exemplary advertisement display screen in Variation of Embodiment 2 of the present invention. Here, a distribution target is a template for creating a video content as a private content material such as a photograph and a video captured by a person.

As shown in FIG. 24, for example, the content sharing system presents, in an area 1801 of a display screen 1800, a list of templates which can be obtained by download by a user. When a tab of the area 1802 is selected, a frame material obtainable separately is presented.

Here, when a template is selected using a focus 1803, a user who used the selected template is presented in the area 1804. In other words, the content sharing system can notify the user that a closer friend has previously used the same template.

Furthermore, when the same template is obtained by the target friend, the content sharing system can present, in an area 1805, a fee adapted to a discount charge setting according to the provision and relay history data. Accordingly, the user can understand that the fee in the setting is more reasonable than the regular price. In other words, the user can select the desired template from among a number of templates more easily by selecting the download button.

Figure 25:
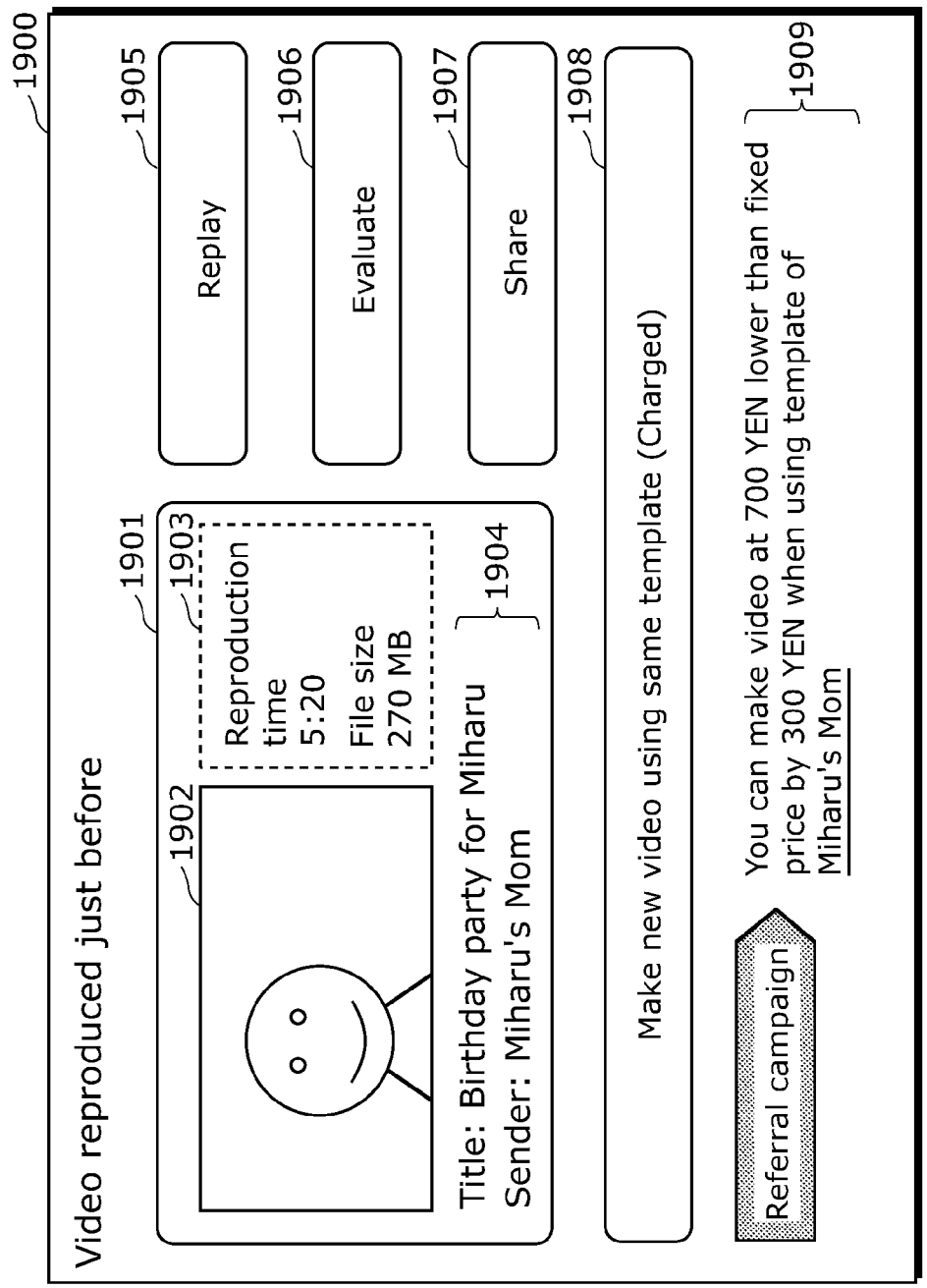
FIG. 25 is a diagram showing an exemplary advertisement display screen in Variation of Embodiment 2 of the present invention.

FIG. 25 is a diagram showing an exemplary advertisement display screen in Variation of Embodiment 2 of the present invention. Here, the distribution target and the charge target is the template used to generate a video content as the private content (the photograph and video captured by the person).

More specifically, FIG. 25 shows a display screen 1900 that is presented for urging a user to perform a next operation at the time of completion of the reproduction of a video content that a user obtained in advance or obtained by streaming. Here, the video content that has reproduced just before is called as a target video. The display screen 1900 includes an area 1901 for presenting information of the target video, various kinds of buttons 1905 to 1908, and an area 1900 for presenting an advertisement.

The area 1901 includes an area 1902 for presenting thumbnails of the target video, an area 1903 for presenting detailed information of the target video, and an area 1904 for presenting information about the title of the target video and about the provision source.

The button 1905 is a button for viewing the target video once more. The button 1906 is a button for presenting a display screen for evaluating the target video. The button 1907 is a button for presenting a display screen for making settings for sharing the target video between others.

The button 1908 is a button for presenting a display screen for creating a new video content, using a template (target template) used to create the target video.

An area 1909 presents that it is possible to obtain a target template of "Miharu's Mom" who is a closer friend and has previously used the target template. Furthermore, the area 1909 presents a fee adapted to the discount charge setting according to the provision and relay history data, in the case of obtaining the target template from the friend.

As a result, the user can understand that the user can obtain the target template at a price lower than the regular price, in the case of obtaining the target template from the friend. Furthermore, the user can select the template from among the plural templates after understanding the conceptional image of the new video content based on the friend's video content, and to reduce labor and time to search out the template.

The content sharing system according to an aspect of the present invention has been described above based on the embodiments, but the present invention is not limited to these embodiments. Those skilled in the art will readily appreciate that many modifications are possible in the exemplary embodiments and other embodiments are possible by arbitrarily combining the structural elements of the embodiments without materially departing from the novel teachings and advantageous effects of the present invention. Accordingly, all of the modifications and other embodiments are intended to be included within the scope of the present invention.

For example, in Embodiment 1 and Embodiment 2, transfer and storage of content data are described as examples for means for sharing the content data. However, means for sharing content data are not limited thereto, and it is also possible to use a real-time viewing format by streaming from the content providing apparatus 100.

In addition, in Embodiment 1 and Embodiment 2, content data item to be handled is described, on a per file basis, as a content data item having one meaning. However, the format of the content data item is not limited thereto, and may be a format for transferring and sharing, between users, a content data item part obtained by dividing the content data item by an arbitrary size.

In addition, Embodiment 1 and Embodiment 2 have been described assuming that, as shown in FIG. 3, the content relaying apparatus 300 includes a social information storage unit 303, and that sharing of content data is controlled based on the social information stored therein. However, the social information does not always need to be stored in the content relaying apparatus 300. For example, the content relaying apparatus 300 may refer to, as necessary, social information that is provided from an external social networking service.

In addition, Embodiment 1 and Embodiment 2 have been described assuming that, as shown in FIG. 1, the content providing apparatus 100, the content obtaining apparatus 400, and the content relaying apparatus 300 are all independent apparatuses. However, embodiments of the content providing apparatus 100 and the content obtaining apparatus 400 are not limited thereto. For example, a mobile apparatus having a function of providing content data to outside may include all the structural elements of the content providing apparatus 100 and the content obtaining apparatus 400. In addition, a home server having a user authentication function may include all the structural elements of the content providing apparatus 100 and the content relaying apparatus 300.

Figure 26:
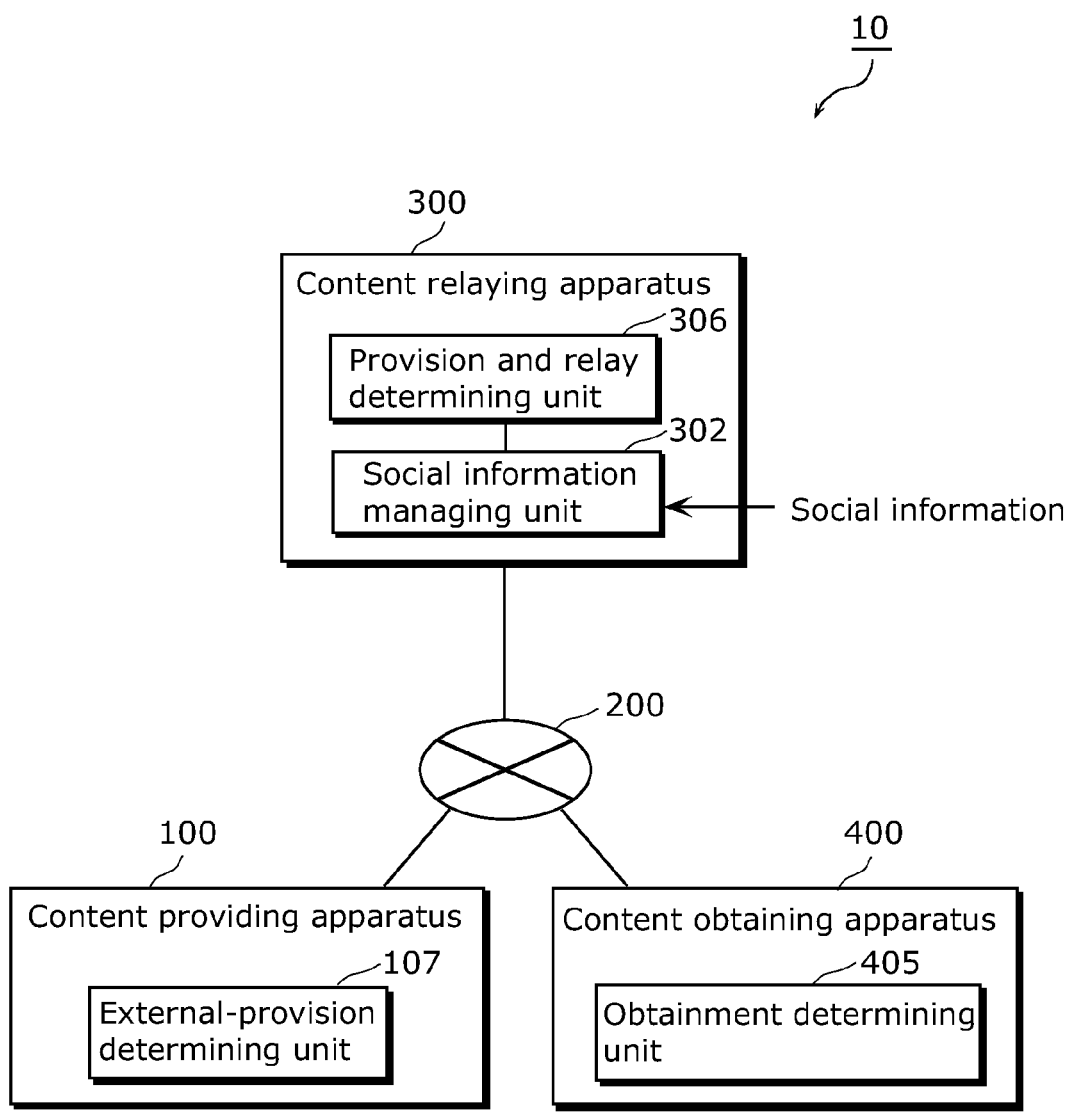
FIG. 26 is a block diagram showing a configuration of a content sharing system according to an aspect of the present invention.

In addition, in Embodiment 1, the content providing apparatus 100, the content relaying apparatus 300, and the content obtaining apparatus 400 have the structural elements shown in FIG. 2, FIG. 3, and FIG. 4, respectively. However, each of these apparatuses do not always need to have the corresponding structural elements shown in a corresponding one of FIG. 2 to FIG. 4. For example, the content sharing system 10 may include the content providing apparatus 100, the content relaying apparatus 300, and the content obtaining apparatus 400 as shown in FIG. 26.

In addition, a part or all of the structural elements of the content providing apparatus 100 according to Embodiment 1 or Embodiment 2 may be configured with a single system LSI (Large Scale Integration) circuit. For example, the content providing apparatus 100 may be configured with a system LSI including an external-provision determining unit 107. In addition, for example, the content relaying apparatus 300 may be configured with a system LSI including a social information managing unit 302 and a provision and relay determining unit 306.

The system LSI is a super-multi-function LSI manufactured by integrating constituent units on a single chip, and is specifically a computer system configured to include a microprocessor, a ROM (Read Only Memory) and a RAM (Random Access Memory), and so on. The ROM includes a computer program recorded therein. The system LSI achieves its function through the microprocessor's operations according to the computer program.

The name used here is system LSI, but it may also be called IC, system LSI, super LSI, or ultra LSI depending on the degree of integration. Moreover, ways to achieve integration are not limited to the LSI, and special circuit or general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

Furthermore, if integrated circuit technology that replaces LSI appears thorough progress in semiconductor technology or other derived technology, that technology can naturally be used to carry out integration of the constituent elements. Biotechnology is anticipated to apply.

As described above, the present invention can be implemented as the content providing apparatus 100, the content relaying apparatus 300, and/or the content obtaining apparatus 400 which include(s) the above-described unique processing units. The present invention can be further realized as a content providing method, a content relaying method, and/or the like having the steps corresponding to the unique processing units of the corresponding one(s) of the content providing apparatus 100, the content relaying apparatus 300, and/or the content obtaining apparatus 400. In addition, the present invention can be realized as a computer program for causing a computer to execute the unique steps of the method(s). Such a computer program can naturally be distributed via non-transitory computer-readable recording media such as CD-ROMs and communication networks such as the Internet.

According to aspects of the present invention, a content sharing system including a content providing apparatus, a content obtaining apparatus, and a content relaying apparatus is applicable to video recorders, home servers, digital still cameras, digital video cameras, personal computers, computers for enterprises (workstations) digital television receivers having an image data obtaining function, set top boxes, car navigation systems, projectors, mobile devices, music components, digital photo frames, remote controllers for controlling apparatuses, and the like.

REFERENCE SIGNS LIST

10 Content sharing system
100, 500 Content providing apparatus
101, 401 Input unit
102, 402 Output unit
103, 403 Application unit
104, 308, 406 Data storage unit
105, 309, 407 Content data storage unit
105a, 309b, 407a Content data
106, 301, 404 Communication unit
107 External-provision determining unit
108 State notifying unit
109 Content modifying unit
110 Provision history managing unit
111, 312 History data storage unit
111a History data
200 Network
300 Content relaying apparatus
302 Social information managing unit
303 Social information storage unit
303a Social information
304 Index managing unit
305 Index data storage unit
305a Index data
306 Provision and relay determination unit
307 State managing unit
309a Modified content data
310 Provision history managing unit
311 Charge managing unit
312a Provision and relay history data
313 Advertisement providing unit
400, 600 Content obtaining apparatus
405 Obtainment determining unit

The invention claimed is:

1. A content sharing system comprising:
a content providing apparatus which is capable of providing content data;
a content obtaining apparatus which obtains the content data from the content providing apparatus through a network; and
a content relaying apparatus which relays network connection between the content obtaining apparatus and the content providing apparatus,
wherein the content relaying apparatus includes:
a social information managing unit configured to obtain a familiarity degree indicating familiarity between a user of the content providing apparatus and a user of the content obtaining apparatus with reference to social information including the familiarity degree between the users, when the content relaying apparatus receives, from the content obtaining apparatus, a first data obtainment request for obtainment of the content data; and
a provision and relay determining unit configured to transmit, to the content obtaining apparatus, connection information for enabling the content obtaining apparatus to establish network connection with the content providing apparatus, when the familiarity degree is larger than or equal to a threshold value,
the content obtaining apparatus includes: an obtainment determining unit configured to transmit, to the content providing apparatus, a second data obtainment request for transmission of the content data, using the connection information, when the content obtaining apparatus transmits the first data obtainment request to the content relaying apparatus and then receives the connection information from the content relaying apparatus, the content providing apparatus includes:

an external-provision determining unit configured to transmit the content data to the content obtaining apparatus, when the content providing apparatus receives the second data obtainment request from the content obtaining apparatus; and a content modifying unit configured to modify the content data to generate modified content data that is smaller in data amount than the content data, the content modifying unit is configured to obtain, from the content relaying apparatus, a familiarity degree of another user with respect to the user of the content providing apparatus, and to generate the modified content data, based on the familiarity degree, the content data is video data including a plurality of pictures, and the content modifying unit is configured to generate the modified content data such that the modified content data includes a greater number of pictures with an image of the other user than pictures without an image of the other user when the familiarity degree of the other user is high with respect a threshold value.

2. The content sharing system according to claim 1, wherein the second data obtainment request includes user information indicating the user of the content obtaining apparatus, and the external-provision determining unit is configured to obtain, from the content relaying apparatus, the familiarity degree between the user indicated by the user information and the user of the content providing apparatus, and to transmit the content data to the content obtaining apparatus such that transmission of the content data is given a higher priority when the familiarity degree is higher.

3. The content sharing system according to claim 1, wherein the content providing apparatus further includes a state notifying unit configured to transmit state information indicating a state of the content providing apparatus to the content relaying apparatus, and the provision and relay determining unit is configured to transmit the connection information to the content obtaining apparatus, based on the state information received from the content providing apparatus.

4. The content sharing system according to claim 1, wherein the external-provision determining unit is further configured to transmit the modified content data to the content relaying apparatus, and the provision and relay determining unit is further configured to store the modified content data into a content data storage unit, and to transmit the modified content data to the content obtaining apparatus, wherein the content obtaining apparatus further includes:

an output unit configured to display the modified content data; and an input unit configured to receive, from the user, an obtainment instruction for obtaining the content data corresponding to the modified content data, and the obtainment determining unit is configured to transmit the first data obtainment request to the content relaying apparatus according to the received obtainment instruction.

5. The content sharing system according to claim 1, wherein the content modifying unit is configured to obtain an available capacity in the content data storage unit from the content relaying apparatus, and to generate the modified content data such that a data amount of the modified content data is changed depending on the available capacity.

6. The content sharing system according to claim 1, wherein the external-provision determining unit is configured to prioritize transmission of the content data when the content data has never been provided to the content obtaining apparatus than when the content data has been previously provided to the content obtaining apparatus.

7. The content sharing system according to claim 1, wherein the content relaying apparatus further includes an advertisement providing unit configured to generate advertisement data relating to the content data, based on the history that the content providing apparatus transmitted the content data to the other content obtaining apparatus according to the connection information, and to transmit the generated advertisement data to the content obtaining apparatus.

8. A content sharing method for use in a content sharing system that includes: a content providing apparatus which is capable of providing content data; a content obtaining apparatus which obtains the content data from the content providing apparatus through a network; and a content relaying apparatus which relays network connection between the content obtaining apparatus and the content providing apparatus, the content sharing method comprising:

transmitting a first data obtainment request for obtainment of the content data to the content relaying apparatus, the transmitting being performed by the content obtaining apparatus;

obtaining a familiarity degree indicating familiarity between a user of the content providing apparatus and a user of the content obtaining apparatus with reference to social information including the familiarity degree between the users, when the content relaying apparatus receives, from the content obtaining apparatus, the first data obtainment request, the obtaining being performed by the content relaying apparatus;

transmitting, to the content obtaining apparatus, connection information for enabling the content obtaining apparatus to establish network connection with the content providing apparatus, when the familiarity degree is larger than or equal to a threshold value, the transmitting being performed by the content relaying apparatus;

transmitting, to the content providing apparatus, a second data obtainment request for transmission of the content data, using the connection information, when the content obtaining apparatus receives the connection information from the content relaying apparatus, the transmitting being performed by the content obtaining apparatus;

transmitting the content data to the content obtaining apparatus, when the content providing apparatus receives the second data obtainment request from the content obtaining apparatus, the transmitting being performed by the content providing apparatus; and modifying the content data to generate modified content data that is smaller in data amount than the content data, the content modifying step obtains, from the content relaying apparatus, a familiarity degree of another user with respect to the user of the content providing apparatus, and generates the modified content data, based on the familiarity degree, the content data is video data including a plurality of pictures, and the content modifying step generates the modified content data such that the modified content data includes a greater number of pictures with an image of the other user than pictures without an image of the other user when the familiarity degree of the other user is high with respect a threshold value.

9. A content providing apparatus which transmits content data to a content obtaining apparatus through a network, the content providing apparatus comprising:

an external-provision determining unit configured to transmit the content data to the content obtaining apparatus, when the content providing apparatus receives, from the content obtaining apparatus, a data obtainment request for transmission of the content data, wherein the data obtainment request includes user information indicating a user of the content obtaining apparatus, and the external-provision determining unit is configured to obtain, from a content relaying apparatus, a familiarity degree indicating familiarity between the user indicated by the user information and the user of the content providing apparatus, and to transmit the content data to the content obtaining apparatus such that transmission of the content data is given a higher priority when the familiarity degree is higher; and a content modifying unit configured to modify the content data to generate modified content data that is smaller in data amount than the content data, the content modifying unit is configured to obtain, from the content relaying apparatus, a familiarity degree of another user with respect to the user of the content providing apparatus, and to generate the modified content data, based on the familiarity degree, the content data is video data including a plurality of pictures, and the content modifying unit is configured to generate the modified content data such that the modified content data includes a greater number of pictures with an image of the other user than pictures without an image of the other user when the familiarity degree of the other user is high with respect a threshold value.

10. The content providing apparatus according to claim 9, wherein the content relaying apparatus is an integrated circuit.

11. A content providing method of proving content data to a content obtaining apparatus through a network, the content providing method comprising:

transmitting the content data to the content obtaining apparatus, when the content providing apparatus receives, from the content obtaining apparatus, a data obtainment request for transmission of the content data, wherein the data obtainment request includes user information indicating a user of the content obtaining apparatus, and the external-provision determining unit is configured to obtain, from a content relaying apparatus, a familiarity degree indicating familiarity between the user indicated by the user information and the user of the content providing apparatus, and to transmit the content data to the content obtaining apparatus such that transmission of the content data is given a higher priority when the familiarity degree is higher; and modifying the content data to generate modified content data that is smaller in data amount than the content data, the content modifying step obtains, from the content relaying apparatus, a familiarity degree of another user with respect to the user of the content providing apparatus, and generates the modified content data, based on the familiarity degree, the content data is video data including a plurality of pictures, and the content modifying step generates the modified content data such that the modified content data includes a greater number of pictures with an image of the other user than pictures without an image of the other user when the familiarity degree of the other user is high with respect a threshold value.

12. A non-transitory computer-readable recording medium on which a program is recorded, the program being for causing a computer to execute the content providing method according to claim 11.

* * * * *